(12) United States Patent
Kwon et al.

(10) Patent No.: US 10,958,489 B2
(45) Date of Patent: Mar. 23, 2021

(54) METHOD AND APPARATUS FOR WIRELESS COMMUNICATION USING MODULATION, CODING SCHEMES, AND CHANNEL QUALITY INDICATORS

(71) Applicant: Samsung Electronics Co., Ltd., Suwon-si (KR)

(72) Inventors: Yangsoo Kwon, Seoul (KR); Jeong hun Kim, Hwaseong-si (KR); Young-seok Jung, Suwon-si (KR); Min-goo Kim, Hwaseong-si (KR); In-hyoung Kim, Yongin-si (KR); Jong-hun Rhee, Suwon-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 178 days.

(21) Appl. No.: 15/884,892

(22) Filed: Jan. 31, 2018

(65) Prior Publication Data

US 2018/0279337 A1 Sep. 27, 2018

(30) Foreign Application Priority Data

Mar. 21, 2017 (KR) .................. 10-2017-0035514
May 8, 2017 (KR) .................. 10-2017-0057591
(Continued)

(51) Int. Cl.
*H04L 27/00* (2006.01)
*H04L 1/00* (2006.01)
(Continued)

(52) U.S. Cl.
CPC ........ *H04L 27/0008* (2013.01); *H04L 1/0003* (2013.01); *H04L 1/0016* (2013.01);
(Continued)

(58) Field of Classification Search
None
See application file for complete search history.

(56) References Cited

U.S. PATENT DOCUMENTS

| 8,948,799 | B1 * | 2/2015 | Xu ..................... H04B 17/00 455/501 |
| 9,407,417 | B2 | 8/2016 | Chen et al. |

(Continued)

FOREIGN PATENT DOCUMENTS

| EP | 2667533 A1 | 11/2013 |
| WO | WO-2016/164074 A1 | 10/2016 |
| WO | WO-2016/190804 A1 | 12/2016 |

OTHER PUBLICATIONS

Qualcomm Incorporated, "Modulation enhancements for PUSCH", 3GPP TSG RAN WG1 Meeting #88, Athens Greece, Feb. 13-17, 2017, R1-1702572 (Year: 2017).*

(Continued)

*Primary Examiner* — Joseph A Bednash
(74) *Attorney, Agent, or Firm* — Harness, Dickey & Pierce, P.L.C.

(57) ABSTRACT

A wireless communication method including receiving, through a wireless channel, table indication information indicating one of a first Modulation and Coding Scheme (MCS) table supporting up to 64 Quadrature Amplitude Modulation (QAM) and second and third MCS tables supporting up to 256 QAM, the third MCS table including a same number of MCS indices as the second MCS table and including less MCS indices corresponding to 256 QAM than the second MCS table, and identifying one of the first to third MCS tables according to the received table indication information to recognize a demodulation scheme for data to be received through the wireless channel may be provided.

13 Claims, 28 Drawing Sheets

(30) Foreign Application Priority Data

May 25, 2017 (KR) .................. 10-2017-0064894
Aug. 7, 2017 (KR) .................. 10-2017-0099609

(51) Int. Cl.
  *H04L 27/34*   (2006.01)
  *H04W 72/12*   (2009.01)

(52) U.S. Cl.
  CPC .......... *H04L 27/34* (2013.01); *H04L 27/3405* (2013.01); *H04W 72/1257* (2013.01); *H04L 1/0009* (2013.01); *H04L 1/0025* (2013.01); *H04L 1/0026* (2013.01)

(56) References Cited

U.S. PATENT DOCUMENTS

| | | | |
|---|---|---|---|
| 9,419,772 B2 | 8/2016 | Kim et al. | |
| 9,461,771 B2 | 10/2016 | Kang et al. | |
| 2014/0092785 A1* | 4/2014 | Song | H04W 28/0278 370/280 |
| 2014/0192732 A1* | 7/2014 | Chen | H04L 1/0009 370/329 |
| 2015/0215913 A1 | 7/2015 | Cheng et al. | |
| 2015/0312071 A1* | 10/2015 | Chen | H04L 27/0008 370/329 |
| 2015/0312082 A1 | 10/2015 | Shin et al. | |
| 2016/0036618 A1 | 2/2016 | Einhaus et al. | |
| 2016/0211904 A1 | 7/2016 | Kim et al. | |
| 2017/0070374 A1 | 3/2017 | Nakamura et al. | |
| 2017/0078045 A1 | 3/2017 | Hammarwall et al. | |
| 2017/0257264 A1* | 9/2017 | Liu | H04W 74/0833 |
| 2018/0323902 A1* | 11/2018 | Rico Alvarino | H04L 1/0031 |
| 2019/0182715 A1* | 6/2019 | Urabayashi | H04L 5/0094 |

OTHER PUBLICATIONS

Qualcomm et al. "WF on Modulation enhancements for voice/video", 3GPP TSG RAN WG1 Meeting #88, Athens, Greece Feb. 13-17, 2017 (Year: 2017).*
European Examination Report dated Jan. 7, 2020 issued in corresponding European Patent Application No. 18 162 728.2.
ZTE, "Evaluation and standard impact on EVM and receiver impairment for small cell 256QAM," 3GPP TSG RAN WG1, vol. R1-135348, pp. 1-7 (2013).
Partial European Search Report dated Aug. 10, 2018 issued in European Application No. 18162728.2.
QualCom Incorporated, Et al. "Discussion on modulation enhancements," 3GPP Draft; R1-1720390 Discussion on Modulation Enhancements, 3rd Generation Partnership Project (3GPP), Mobile Competence Centre; 650, Route Des Lucioles; F-06921 Sophia-Antipolis Cedex; France, vol. Ran WG1, No. Reno, USA, pp. 1-7 (2017).
Extended European Search Report dated Jan. 18, 2019 issued in European Application No. 18162728.2.

\* cited by examiner

FIG. 3A

T_64MCS

| MCS INDEX | MODULATION ORDER | TBS INDEX |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26/26A |
| 29 | 2 | |
| 30 | 4 | RESERVED |
| 31 | 6 | |

FIG. 3B

T_64CQI

| CQI INDEX | MODULATION | CODE RATE x 1024 | EFFICIENCY |
|---|---|---|---|
| 0 | OUT OF RANGE | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 564 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 4A

T_256MCS

| MCS INDEX | MODULATION ORDER | TBS INDEX |
|---|---|---|
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 11 |
| 7 | 4 | 12 |
| 8 | 4 | 13 |
| 9 | 4 | 14 |
| 10 | 4 | 15 |
| 11 | 6 | 16 |
| 12 | 6 | 17 |
| 13 | 6 | 18 |
| 14 | 6 | 19 |
| 15 | 6 | 20 |
| 16 | 6 | 21 |
| 17 | 6 | 22 |
| 18 | 6 | 23 |
| 19 | 6 | 24 |
| 20 | 8 | 25 |
| 21 | 8 | 27 |
| 22 | 8 | 28 |
| 23 | 8 | 29 |
| 24 | 8 | 30 |
| 25 | 8 | 31 |
| 26 | 8 | 32 |
| 27 | 8 | 33/33A |
| 28 | 2 | RESERVED |
| 29 | 4 | |
| 30 | 6 | |
| 31 | 8 | |

| CQI INDEX | MODULATION | CODE RATE x 1024 | EFFICIENCY |
|---|---|---|---|
| 0 | OUT OF RANGE | | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

FIG. 7A

T_256MCS'

| MCS INDEX | MODULATION ORDER | TBS INDEX |
|---|---|---|
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 11 |
| 7 | 4 | 12 |
| 8 | 4 | 13 |
| 9 | 4 | 14 |
| 10 | 4 | 15 |
| 11 | 6 | 16 |
| 12 | 6 | 17 |
| 13 | 6 | 18 |
| 14 | 6 | 19 |
| 15 | 6 | 20 |
| 16 | 6 | 21 |
| 17 | 6 | 22 |
| 18 | 6 | 23 |
| 19 | 6 | 24 |
| 20 | 6 | 25 |
| 21 | 6 | 27 |
| 22 | 6 | 28 |
| 23 | 6 | 29 |
| 24 | 8 | 30 |
| 25 | 8 | 31 |
| 26 | 8 | 32 |
| 27 | 8 | 33/33A |
| 28 | 2 | RESERVED |
| 29 | 4 | |
| 30 | 6 | |
| 31 | 8 | |

FIG. 7B

T_256CQI'

| CQI INDEX | MODULATION | CODE RATE x 1024 | EFFICIENCY |
|---|---|---|---|
| 0 | out of range | | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 64QAM | 948 | 5.5547 |
| 13 | 256QAM | 797 | 6.2266 |
| 14 | 256QAM | 885 | 6.9141 |
| 15 | 256QAM | 948 | 7.4063 |

FIG. 9

```
SupportedBandEUTRA-v1400 ::=   SEQUENCE {
    dl-256QAM-r14A              ENUMERATED {supported} OPTIONAL,
    dl-256QAM-r14B              ENUMERATED {supported} OPTIONAL,
}
```

FIG. 10A

```
PDSCH-ConfigDedicated-v1400 ::=   SEQUENCE {
    tbsIndexAlt-r14             ENUMERATED {a26, a33, a33b}   OPTIONAL -- Need OR
}
```

FIG. 10B

```
PDSCH-ConfigDedicated-v1400 ::=   SEQUENCE {
    tbsIndexAlt-r14             ENUMERATED {a26, a33b}   OPTIONAL -- Need OR
}
```

FIG. 11

```
Dynamic-MCS-Table-v1400 ::=   SEQUENCE {
    DynamicMCS -r14              ENUMERATED {static, dynamic}    OPTIONAL
}
Dynamic-CQI-Table-v1400 ::=   SEQUENCE {
    DynamicCQI -r14              ENUMERATED {static, dynamic}    OPTIONAL
}
```

```
CQI-ReportConfig-v1400 ::=    SEQUENCE {
    altCQI-Table-r14      ENUMERATED {
                    allSubframes,  csi-SubframeSet1,
                    csi-SubframeSet2, spare1}    OPTIONAL       -- Need OP
}
```

```
CQI-ReportConfig-v1400 ::=    SEQUENCE {
altCQI-r14                    ENUMERATED {A, B}    OPTIONAL
altCQI-Table-r14              ENUMERATED {
                              allSubframes, csi-SubframeSet1,
                              csi-SubframeSet2, spare1}    OPTIONAL    -- Need OP
}
```

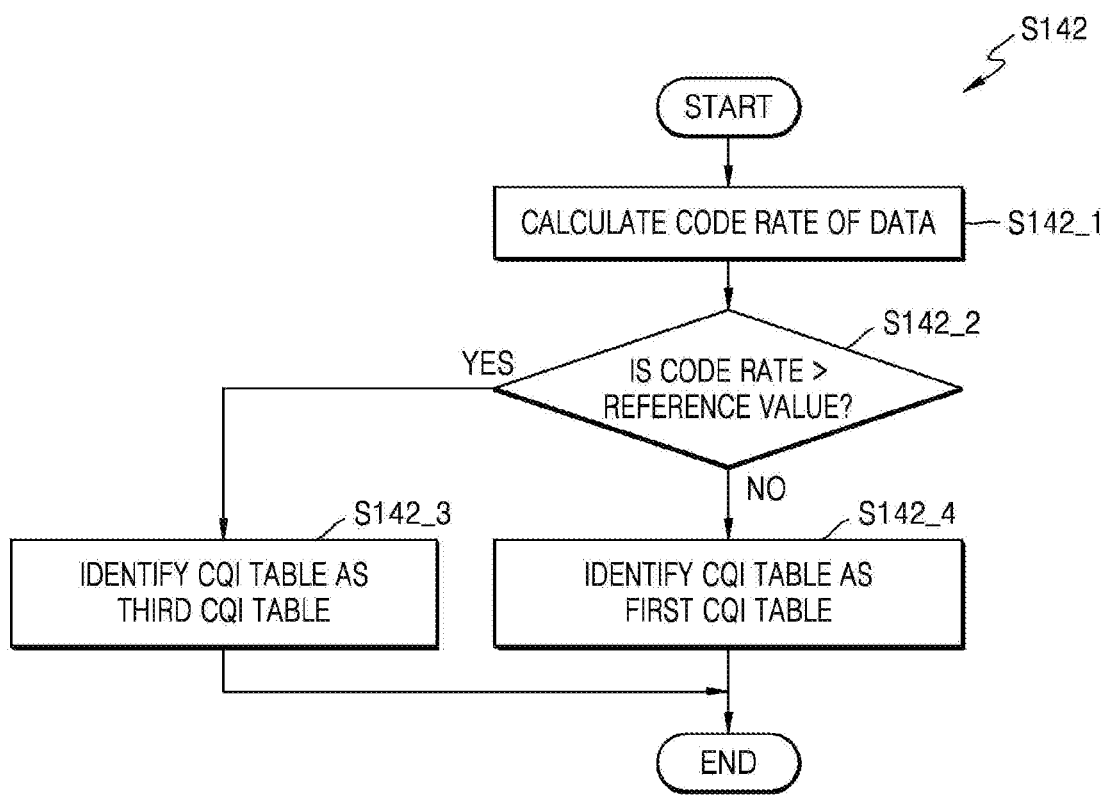

METHOD AND APPARATUS FOR WIRELESS COMMUNICATION USING MODULATION, CODING SCHEMES, AND CHANNEL QUALITY INDICATORS

CROSS-REFERENCE TO RELATED APPLICATIONS

This application claims priority under 35 U.S.C. § 119 to Korean Patent Application No. 10-2017-0035514, filed on Mar. 21, 2017, Korean Patent Application No. 10-2017-0057591, filed on May 8, 2017, Korean Patent Application No. 10-2017-0064894, filed on May 25, 2017, and Korean Patent Application No. 10-2017-0099609, filed on Aug. 7, 2017, in the Korean Intellectual Property Office, the disclosures of which are incorporated herein in their entireties by reference.

BACKGROUND

The inventive concepts relate to wireless communications, and more particularly, to wireless communication methods and devices using modulation, coding schemes, and channel quality indicators.

A wireless communication system may increase a modulation order of a modulation scheme as one of various schemes of increasing a throughput in the wireless communication system. For instance, 256 Quadrature Amplitude Modulation (QAM) is used for Long Term Evolution (LTE), and 256 QAM may provide a maximum throughput that is increased about 33% or more than 64 QAM. However, according to situations, a modulation scheme having a high modulation order provides a lower throughput than a modulation scheme having a low modulation order due to, for example, high complexity.

SUMMARY

The inventive concepts provide wireless communication methods and/or devices for effectively controlling a modulation scheme used for data reception/transmission in a wireless communication system.

According to an aspect of the inventive concepts, a wireless communication method may include receiving, through a wireless channel, table indication information indicating one of a first Modulation and Coding Scheme (MCS) table supporting up to 64 Quadrature Amplitude Modulation (QAM), and second and third MCS tables supporting up to 256 QAM, the third MCS table including a same number of MCS indices as the second MCS table and including less MCS indices corresponding to 256 QAM than the second MCS table, and identifying one of the first to third MCS tables according to the received table indication information to recognize a demodulation scheme for data to be received through the wireless channel, wherein the third MCS table includes the same number of MCS indices as the second MCS table and less MCS indices corresponding to 256 QAM than the second MCS table.

According to another aspect of the inventive concepts, a wireless communication method may include identifying one of a first Modulation and Coding Scheme (MCS) table supporting up to 64 Quadrature Amplitude Modulation (QAM), and second and third MCS tables supporting up to 256 QAM, according to table indication information received through a wireless channel, receiving an MCS index through the wireless channel, and recognizing a demodulation scheme of data received through the wireless channel, based on the identified one of the first to third MCS tables, the recognizing selectively recognizing and the received MCS index, the recognizing selectively recognizing 64 QAM as the demodulation scheme in response to the identified one of the first to third MCS tables being the second MCS table and the received MCS index corresponding to 256 QAM.

According to another aspect of the inventive concepts, a wireless communication device may include a memory configured to store a plurality of computer-readable instructions, and a processor configured to execute the computer-readable instructions stored in the memory such that the processor is configured to perform the above method(s).

BRIEF DESCRIPTION OF THE DRAWINGS

Example embodiments of the inventive concepts will be more clearly understood from the following detailed description taken in conjunction with the accompanying drawings in which:

FIG. 3A is a modulation and coding scheme (MCS) table included in MCS tables of FIG. 1;

FIG. 3B is a channel quality indicator (CQI) table corresponding to the MCS table of FIG. 3A;

FIG. 4A is an MCS table included in the MCS tables of FIG. 1;

FIG. 7A is an MCS table included in the MCS tables of FIG. 1, according to an example embodiment;

FIG. 7B is a CQI table corresponding to the MCS table of FIG. 7A;

FIG. 9 illustrates an example of table support information transmitted by user equipment in operation S70 of FIG. 8, according to an example embodiment;

FIGS. 10A and 10B illustrate examples of table indication information transmitted by a base station in operation S71 of FIG. 8, according to some example embodiments;

FIG. 11 illustrates an example of table indication information transmitted by a base station in operation S71 of FIG. 8, according to an example embodiment;

FIG. 15 is a flowchart of an example of an operation in which user equipment identifies a CQI table, according to an example embodiment;

DETAILED DESCRIPTION

Figure 1:
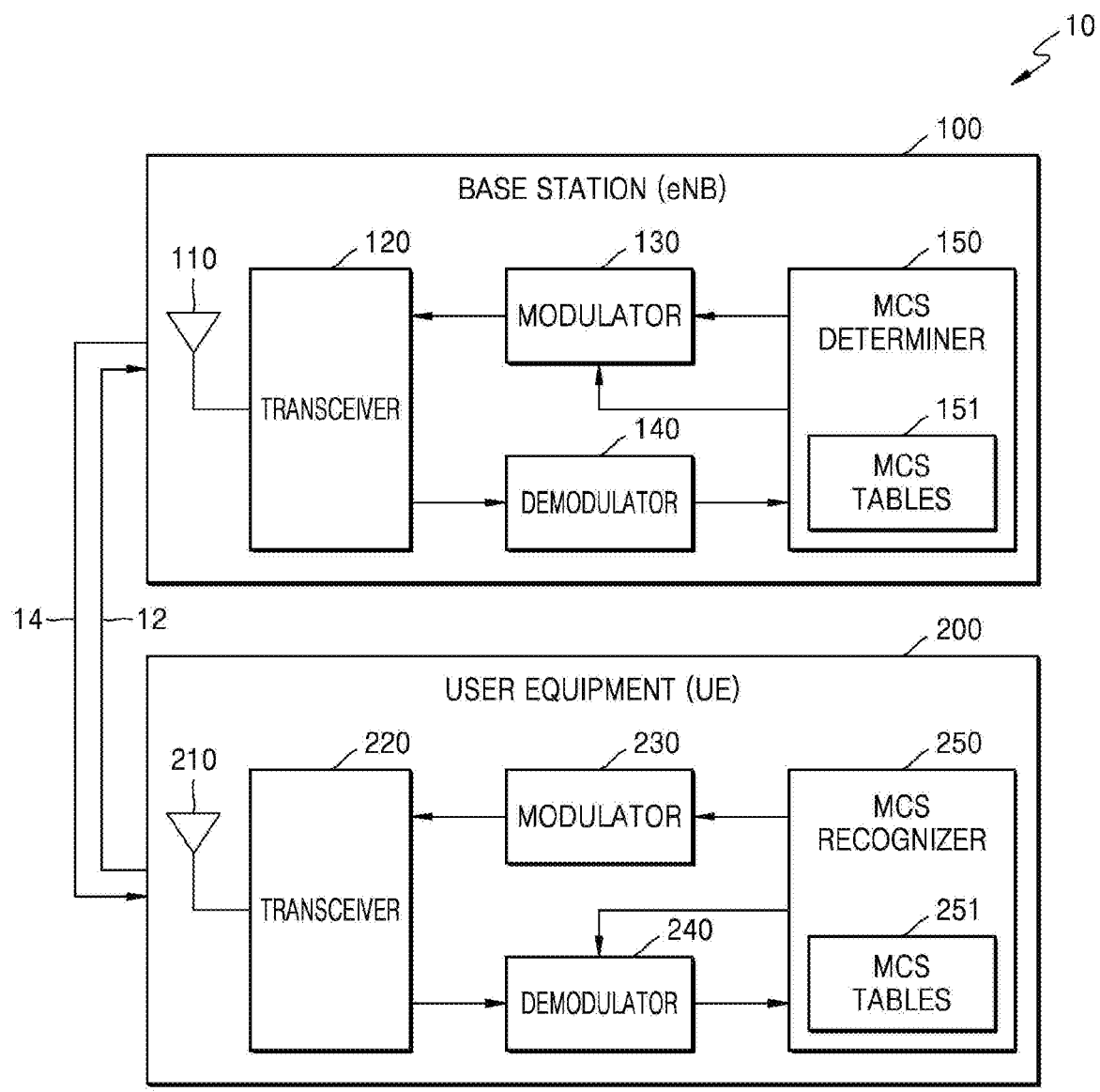
FIG. 1 is a block diagram of a wireless communication system including a base station and user equipment, according to an example embodiment.

FIG. 1 is a block diagram of a wireless communication system 10 including a base station (eNB) 100 and user equipment (UE) 200, according to an example embodiment.

As a non-limiting example, the wireless communication system 10 may be a Long Term Evolution (LTE) system, a Code Division Multiple Access (CDMA) system, a Global System for Mobile Communications (GSM) system, a Wireless Local Area Network (WLAN) system, or another arbitrary wireless communication system. Hereinafter, the wireless communication system 10 will be described as an LTE system, but one or more example embodiments of the inventive concepts are not limited thereto.

For example, the eNB 100 may be a fixed station communicating with UE and/or other eNBs, and as the eNB 100 communicates with the UE and/or the other eNBs, the eNB 100 may exchange data and control information with the UE and/or the other eNBs. For example, the eNB 100 may be referred to as a Node B, an evolved-Node B, a sector, a site, a Base Transceiver System (BTS), an Access Point (AP), a relay node, a Remote Radio Head (RRH), a Radio Unit (RU), or a small cell. In the disclosure, the eNB 100 or cell may refer to a function or an area covered by a base station controller in CDMA, a Node-B in WCDMA, an eNB or a sector (site) in LTE, and may include a mega cell, a macro cell, a micro cell, a picocell, a femtocell, and/or various coverage areas, e.g., coverage ranges of a relay node, an RRH, an RU, or a small cell.

The UE 200 may be a wireless communication device that is at a fixed location or portable and may denote various devices capable of receiving and transmitting data and/or control information from and to the eNB 100 by communicating with the eNB 100. For example, the UE 200 may refer to terminal equipment, a Mobile Station (MS), a Mobile Terminal (MT), a User Terminal (UT), a Subscriber Station (SS), a wireless device, or a handheld device.

A wireless communication network between the UE 200 and the eNB 100 may support communication between users by allowing available network resources to be shared. For example, via a wireless communication network, information may be transmitted in various multiple access manners such as CDMA, Frequency Division Multiple Access (FDMA), Time Division Multiple Access (TDMA), Orthogonal Frequency Division Multiple Access (OFDMA), Single Carrier Frequency Division Multiple Access (SC-FDMA), OFDM-FDMA, OFDM-TDMA, or OFDM-CDMA.

As illustrated in FIG. 1, the UE 200 and the eNB 100 may communicate with each other through an uplink (UL) 12 and a downlink (DL) 14. In a wireless system (e.g., an LTE system or an LTE-Advanced system), the UL 12 and the DL 14 may transmit control information through control channels (e.g., a Physical Downlink Control Channel (PDCCH), a Physical Control Format Indicator Channel (PCFICH), a Physical Hybrid ARQ Indicator Channel (PHICH), a Physical Uplink Control Channel (PUCCH), or an Enhanced Physical Downlink Control Channel (EPDCCH)), or may transmit data through data channels (e.g., a Physical Downlink Shared Channel (PDSCH), a Physical Uplink Shared Channel (PUSCH), etc. Further, the UL 12 and the DL 14 may transmit the control information through an EPDCCH, or extended PDCCH (EPDCCH)).

In the present disclosure, transmitting and receiving signals through channels such as a PUCCH, a PUSCH, a PDCCH, an EPDCCH, and a PDSCH may be described as "transmitting and receiving a PUCCH, a PUSCH, a PDCCH, an EPDCCH, and a PDSCH." Further, transmitting and receiving a PDCCH or transmitting and receiving signals through a PDCCH may include transmitting and receiving an EPDCCH or transmitting and receiving signals through an EPDCCH. In some example embodiments, a PDCCH may be a PDCCH or an EPDCCH or may include both a PDCCH and an EPDCCH. Further, in the present disclosure, high layer signaling may include Radio Resource Control (RRC) signaling via which RRC information including RRC parameters is transmitted.

Referring to FIG. 1, the eNB 100 may include an antenna 110, a transceiver 120, a modulator 130, a demodulator 140, and a modulation and coding scheme (MCS) determiner 150. Although FIG. 1 illustrates the transceiver 120 as one block, the transceiver 120 may be separated into a transmitter and a receiver which are respectively connected to the modulator 130 and the demodulator 140. Further, although the modulator 130, the demodulator 140, and the MCS determiner 150 are as illustrated as separate elements in FIG. 1, the modulator 130, the demodulator 140, and the MCS determiner 150 may be implemented as one modem.

The transceiver 120 may transmit signals through the antenna 110 and the DL 14. For example, the transceiver 120 may shift a band of signals provided by the modulator 130 from a baseband to a Radio Frequency (RF) band and may amplify the signals having the shifted band by using, for example, a Power Amplifier (PA), and provide the amplified signals to the antenna 110. The transceiver 120 may process signals received through the UL 12 and the antenna 110 and may provide the processed signals to the demodulator 140. For example, the transceiver 120 may amplify the signals, which are received through the antenna 110, by using, for example, a Low Noise Amplifier (LNA), shift a band of the amplified signals from an RF band to a baseband, and provide the signals having the shifted band to the demodulator 140.

The MCS determiner 150 may determine an MCS used to receive/transmit data through the UL 12 and the DL 14. As illustrated in FIG. 1, the MCS determiner 150 may include MCS tables 151 and may determine the MCS by referring to the MCS tables 151. Modulation may indicate conversion of strengths, displacement, frequencies, phases, etc. of signals, and for example, digital modulation may indicate conversion of signals by matching digital information to one of available signals. For example, in 3rd Generation Partnership Project (3GPP) LTE, digital modulation schemes used to transmit data through the DL 14 are Quadrature Phase-Shift Keying (QPSK) (or 4 QAM), 16 QAM, 64 QAM, and 256 QAM, and modulation orders of the digital modulation schemes may correspond to 2, 4, 6, and 8, respectively. The MCS determiner 150 may determine one of the modulation schemes for the DL 14 based on a channel state of the DL 14, and the determined modulation scheme may be provided to the UE 200 by using Downlink Control Information (DCI).

The MCS tables 151 may include MCS indices as entries, and each MCS index may correspond to one MCS. As to be described below, because the UE 200 may include MCS tables 251, the eNB 100 may transmit the MCS indices included in the MCS tables 151 to the UE 200 through the DL 14, and thus may indicate MCSs corresponding to the transmitted MCS indices. With the improvement of performance of the wireless communication system 10, modulation schemes supported by the MCS tables may be diversified, and accordingly, the eNB 100 may include the existing MCS tables as well as new MCS tables due to the diversified modulation schemes so that the eNB 100 may support legacy wireless devices. For example, the MCS tables 151 may include an MCS table T_64MCS of FIG. 3A supporting up to 64 QAM as well as an MCS table T_256MCS of FIG. 4A added by 3GPP Release-12 (2015), and thus support up to 256 QAM. Therefore, the MCS determiner 150 may determine the MCS table first and then determine the MCS indices. The MCS tables 151 will be described below in more detail with reference to FIGS. 3A, 4A, 7A, etc.

Similar to the eNB 100, the UE 200 may include an antenna 210, a transceiver 220, a modulator 230, a demodulator 240, and an MCS recognizer 250, as illustrated in FIG. 1. The transceiver 220 may receive signals through the DL 14 and the antenna 210 and may transmit the signals through the antenna 210 and the UL 12.

The MCS recognizer 250 may include the MCS tables 251 and may recognize the MCS from the signals, which are received from the eNB 100 through the DL 14, by referring to the MCS tables 251. For example, the MCS recognizer 250 may use the UL 12 to provide the eNB 100 with information regarding the MCS table that the MCS recognizer 250 may support, and may recognize the MCS indices according to indications of the MCS table and the MCS indices which are received from the eNB 100 through the DL 14. The MCS recognizer 250 may control the demodulator 240 according to a demodulation scheme corresponding to the recognized MCS indices.

As described above, the MCS determiner 150 of the eNB 100 and the MCS recognizer 250 of the UE 200 may refer to the MCS tables 151 and 251, respectively, so as to determine or recognize the MCS indices. However, as to be described below with reference to FIGS. 6A to 6C, MCS indices determined according to the existing MCS tables may correspond to modulation schemes that provide relatively low throughputs according to situations. According to an example embodiment, the MCS determiner 150 of the eNB 100 and the MCS recognizer 250 of the UE 200 may increase a throughput by using a modulation scheme, which is different from modulation schemes used for the existing MCS tables, in a situation where low throughputs are provided according to the existing MCS tables. According to some example embodiments, various mechanisms for employing modulation schemes different from those for the existing MCS tables may be available.

Figure 2:
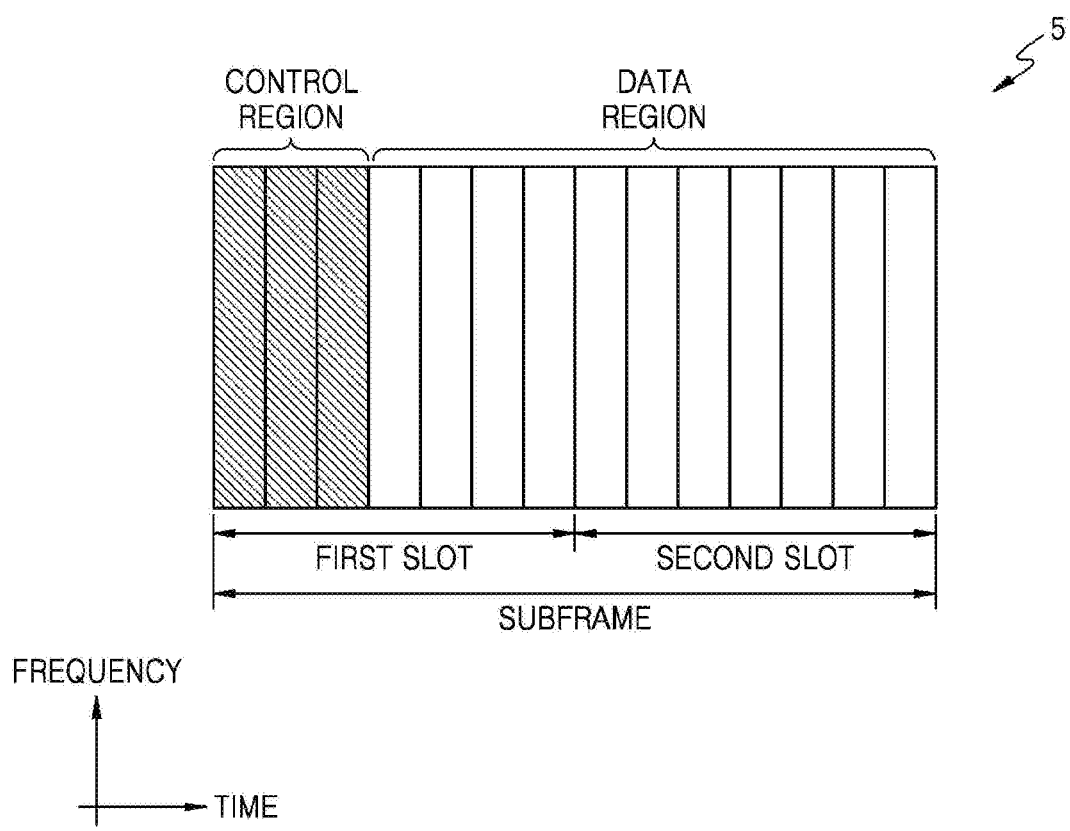
FIG. 2 illustrates a structure of a sub-frame transmitted through a downlink of FIG. 1, according to an example embodiment.

FIG. 2 illustrates a structure of a sub-frame 5 transmitted through the DL 14 of FIG. 1, according to an example embodiment. The sub-frame 5 transmitted through the DL 14 may be referred as to a downlink sub-frame.

Referring to FIG. 2, in an OFDM-based LTE system, the downlink sub-frame 5 may include two slots, and each slot may include 7 OFDM symbols. In a first slot, first three OFDM symbols may be a control region to which control channels are assigned, and the rest of the OFDM symbols may be a data region to which data channels, for example, PDSCHs, are assigned. In a 3GPP LTE system, the control region may include a PDCCH including a location of the PDSCH and DCI, a PCFICH indicating the number of OFDM symbols (i.e., a size of the control region) included in the control region, and a PHICH including a response signal regarding an uplink Hybrid Automatic Repeat Request (HARQ) Acknowledgement (ACK)/Negative-Acknowledgement (NACN) signal. The DCI transmitted through the PDSCH may include uplink resource assignment information, downlink resource assignment information, and the like, and as described above, the DCI may also include the MCS indices determined by the MCS determiner 150 of FIG. 1.

FIG. 3A is the MCS table T_64MCS included in the MCS tables 151 and 251 of FIG. 1, and FIG. 3B is a channel quality indicator (CQI) table T_64CQI corresponding to the MCS table T_64MCS of FIG. 3A. In the present disclosure, the MCS table T_64MCS of FIG. 3A may be referred to as a first MCS table or a first legacy MCS table, and the CQI table T_64CQI of FIG. 3B may be referred to as a first CQI table or a first legacy CQI table. Hereinafter, the MCS table T_64MCS and the CQI table T_64CQI of FIGS. 3A and 3B will be described with reference to FIG. 1.

As described above with reference to FIG. 1, the MCS determiner 150 of FIG. 1 may determine one of the modulation schemes for DL 14 based on the channel state of the DL 14. For example, when the channel state of the DL 14 is good according to a desired (or alternatively, predetermined) criteria, the MCS determiner 150 may select a modulation scheme having a high modulation order and thus may increase efficiency of a bandwidth. Further, when the channel state is not good according to a desired (or alternatively, predetermined) criteria, the MCS determiner 150 may select a modulation scheme having a low modulation order to overcome the bad channel state, thereby maintaining robust transmission. A method of adjusting the MCS according to the channel state may be referred to as link adaptation. The link adaptation may be implemented by compensating for a state of a wireless channel that temporally changes and adjusting the MCS to increase a throughput of a wireless system.

Referring to FIG. 3A, the first MCS table T_64MCS may include MCS indices 0 to 31 that are expressed in 5 bits. The MCS indices 0 to 28 of the first MCS table T_64MCS may be used for initial HARQ transmission, and the MCS indices 29 to 31 may be used for HARQ retransmission. Each of the MCS indices 0 to 31 may correspond to one of three different modulation schemes. That is, as illustrated in FIG. 3A, the MCS indices 0 to 9 may correspond to QPSK, the MCS indices 10 to 16 may correspond to 16 QAM, and the MCS indices 17 to 28 may correspond to 64 QAM. As described, multiple MCS indices corresponding to the same modulation scheme may exist, meaning that the MCS indices corresponding to the same modulation scheme may use codes having different rates. The MCS indices 29 to 31 of the first MCS table T_64MCS may be used to distinguish the modulation schemes used for the HARQ retransmission.

Each of QPSK, 16 QAM, and 64 QAM can be used for the HARQ retransmission. Thus, the first MCS table T_64MCS may support up to 64 QAM.

As illustrated in FIG. 3A, each of the MCS indices 0 to 31 may correspond to a transport block size (TBS) index. According to a 3GPP Technical Sheet (TS) 36.213 document, considering the fact that a size of a transmission resource may be assigned to the UE 200 from a pair of Physical Resource Blocks (PRBs) to 110 pairs of PRBs, 110 TBSs that are transportable information bits may be defined for each TBS index.

The MCS determiner 150 and the MCS recognizer 250 of FIG. 1 may each include the first CQI table T_64CQI of FIG. 3B. As described above with reference to FIG. 1, the UE 200 may transmit, to the eNB 100, feedback on the channel state of the DL 14 so that the MCS determiner 150 may recognize the channel state of the DL 14. Information regarding the feedback on the channel state, which is transmitted by the UE 200 to the eNB 100, may be referred to as channel state information (CSI), and the CSI may include a Pre-coding Matrix Indicator (PMI), a Rank Indicator (RI), and a CQI. The PMI and RI may be CSI regarding Multiple-Input Multiple-Output (MIMO) transmission, and the CQI may be generated based on a CQI table (e.g., the first CQI table T_64CQI) that includes, as entries, multiple CQI indices that respectively correspond to a code rate, transmission efficiency, and an available modulation scheme that the UE 200 may use according to the channel state.

Referring to FIG. 3B, the first CQI table T_64CQI may include CQI indices 0 to 15 that are expressed in 4 bits. As illustrated in FIG. 3B, each of the CQI indices 1 to 15 may correspond to one of three different modulation schemes, and the CQI indices 1 to 15 may respectively correspond to 15 different transmission efficiencies. The first CQI table T_64CQI corresponding to the first MCS table T_64MCS may also support up to 64 QAM.

Figure 4B:
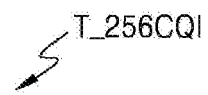
FIG. 4B is a CQI table corresponding to the MCS table of FIG. 4A.

FIG. 4A is the MCS table T_256MCS included in the MCS tables 151 and 251 of FIG. 1. FIG. 4B is a CQI table T_256CQI corresponding to the MCS table T_256MCS of FIG. 4A. In the present disclosure, the MCS table T_256MCS of FIG. 4A may be referred to as a second MCS table or a second legacy MCS table, and the CQI table T_256CQI of FIG. 4B may be referred to as a second CQI table or a second legacy CQI table. Hereinafter, the descriptions previously provided with reference to FIGS. 3A and 3B will not be repeated here, and the MCS table T_256MCS and the CQI table T_256CQI of FIGS. 4A and 4B will be described with reference to FIG. 1.

Referring to FIG. 4A, the second MCS table T_256MCS may include MCS indices 0 to 31 that are expressed in 5 bits. The MCS indices 0 to 27 of the second MCS table T_256MCS may be used for initial HARQ transmission, and the MCS indices 28 to 31 may be used for HARQ retransmission. Each of the MCS indices 0 to 31 may correspond to one of four different modulation schemes. That is, as illustrated in FIG. 4A, the MCS indices 0 to 4 may correspond to QPSK, the MCS indices 5 to 10 may correspond to 16 QAM, the MCS indices 11 to 19 may correspond to 64 QAM, and the MCS indices 20 to 27 may correspond to 256 QAM. The MCS indices 28 to 31 of the second MCS table T_256MCS may be used to distinguish the modulation schemes used for the HARQ retransmission. Each of QPSK, 16 QAM, 64 QAM, and 256 QAM may be used for the HARQ retransmission. Thus, the second MCS table T_256MCS may support up to 256 QAM.

Referring to FIG. 4B, the second CQI table T_256CQI may include CQI indices 0 to 15 that are expressed in 4 bits.

As illustrated in FIG. 4B, each of the CQI indices 1 to 15 may correspond to one of four different modulation schemes, and the CQI indices 1 to 15 may correspond to 15 different transmission efficiencies. That is, the second CQI table T_256CQI corresponding to the second MCS table T_256MCS may also support up to 256 QAM.

The above tables of FIGS. 3A to 4B may be used in the 3GPP LTE system. That is, a base station and user equipment in the 3GPP LTE system may determine the MCS based on the first and second MCS tables T_64MCS and T_256MCS and the first and second CQI tables T_64CQI and T_256CQI. However, as will be described with reference to FIGS. 6A to 6C, the MCS, which is determined based on the first and second MCS tables T_64MCS and T_256MCS and the first and second CQI tables T_64CQI and T_256CQI, may define a modulation scheme that provides a relatively low throughput, compared to other modulation schemes, at a certain signal-to-noise ratio (SNR) situation.

Figure 5A:
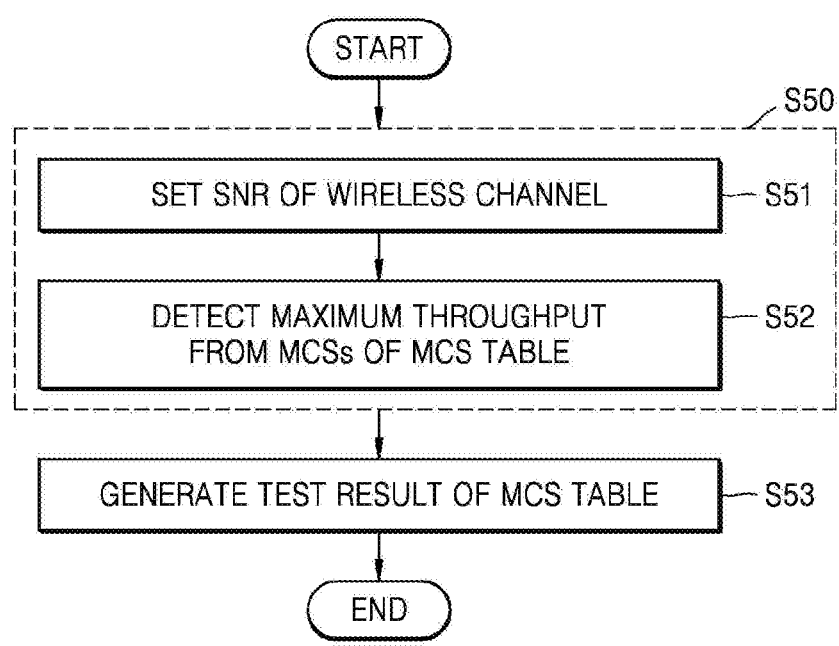
FIGS. 5A to 5C are flowcharts of methods of testing an MCS table, according to some example embodiments.
Figure 5B:
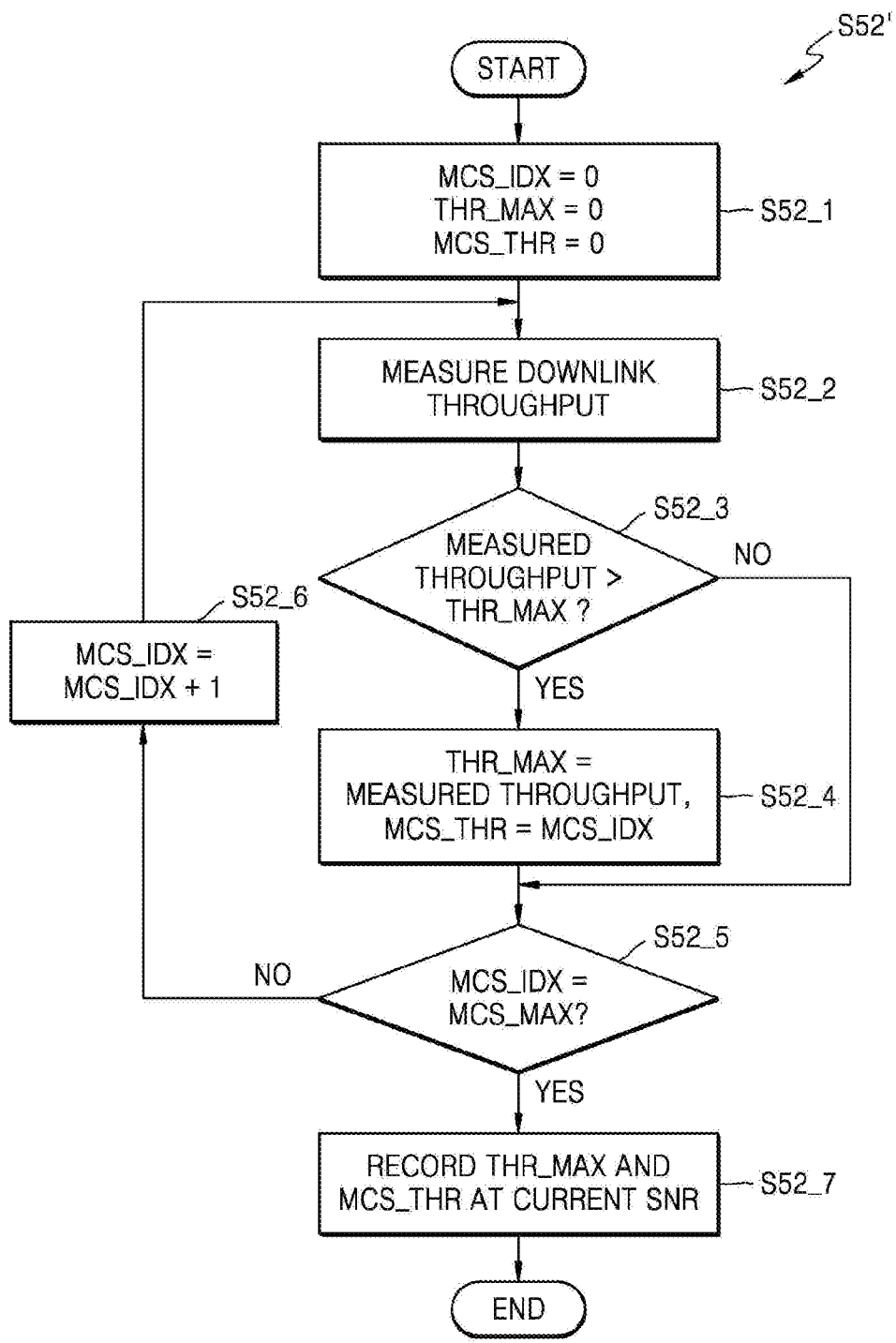
Figure 5C:
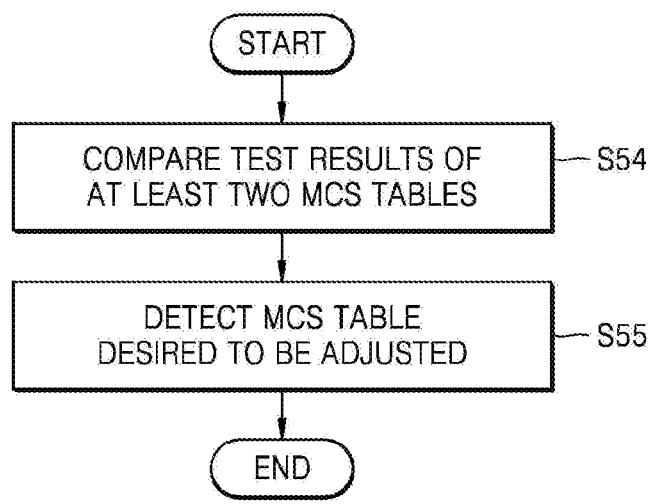

FIGS. 5A to 5C are flowcharts of methods of testing an MCS table, according to some example embodiments. For example, FIG. 5A illustrates a method of generating a test result after testing the MCS table according to an example embodiment. FIG. 5B illustrates an example of operation S52 of FIG. 5A according to an example embodiment. FIG. 5C illustrates a method of detecting an MCS table desired to be adjusted based on the test result according to an example embodiment. At least some operations of the methods illustrated in FIGS. 5A to 5C may be performed by a processor executing a program in some example embodiments, or by hardware implemented through, for example, logic synthesis in some other example embodiments.

Referring to FIG. 5A, in operation S50, a maximum throughput provided by the MCS table according to an SNR may be detected. That is, as the SNR changes, the maximum throughput among throughputs corresponding to the MCS indices included in the MCS table may be detected at a preset (or alternatively, desired) SNR. As illustrated in FIG. 5A, operation S50 may include operations S51 and S52, and operations S51 and S52 may be repeatedly performed.

In operation S51, an SNR of a wireless channel may be set. That is, an SNR for detecting the maximum throughput may be set, and when the maximum throughput is detected, an SNR having a different value may be set. For example, the SNR may be set to increase or decrease by one decibel (dB) whenever the maximum throughput is detected.

In operation S52, the maximum throughput may be detected from the MCSs of the MCS table. For example, at the SNR that is set in operation S51, throughputs according to the MCSs respectively corresponding to the MCS indices included in the MCS table may be detected, and the maximum throughput among the throughputs may be detected. Operation S52 will be described below in more detail with reference to FIG. 5B.

In operation S53, the test result of the MCS table may be generated. For example, in operation S50, maximum throughputs respectively corresponding to the SNRs may be detected, and thus test results (e.g., graphs of FIGS. 6A to 6C) may be generated by collecting the maximum throughputs. The test results may be used to evaluate the MCS table and compare at least two MCS tables.

Referring to FIG. 5B, in operation S52' that is an example of operation S52 of FIG. 5A, the maximum throughputs may be detected from the MCSs of the MCS table. As described above, in operation S52', the maximum throughputs may be detected from the MCS table at a certain SNR, and the detection may be repeatedly performed at different SNRs by, for example, gradually increasing or decreasing the SNR). FIG. 5B illustrates an example of measuring a downlink throughput of a wireless channel, but the inventive concepts are not limited thereto.

In operation S52_1, variables may be initialized. For example, as illustrated in FIG. 5B, "MCS_IDX" indicating an MCS index, "THR_MAX" indicating a maximum throughput at a current SNR, and "MCS_THR" indicating an MCS index corresponding to the maximum throughput may be set to 0.

In operation S52_2, the downlink throughput may be measured. For example, the downlink throughput may be measured through a simulation at the current SNR and in the MCS index.

In operation S52_3, a determination as to whether the measured throughput is greater than a current maximum throughput (e.g., current value of "THR_MAX"), may be made. That is, when the measured throughput is greater than "THR_MAX", operation S52_4 may be subsequently performed, but when the measured throughput is less than "THR_MAX", operation S52_5 may be subsequently performed.

In operation S52_4, if the measured throughput is greater than the current value of "THR_MAX", "THR_MAX" and "MCS_THR" may be updated. For example, as illustrated in FIG. 5B, "THR_MAX" may be updated as the measured throughput, and "MCS_THR" may be updated as "MCS_IDX" indicating a current MCS index. If the throughput measured in operation S52_3 is determined to be less than "THR_MAX", "THR_MAX" and "MCS_THR" may not be updated.

In operation S52_5, a determination as to whether the current MCS index is a final MCS index of the MCS table may be made. That is, as illustrated in FIG. 5B, a determination as to whether "MCS_IDX" indicating the current MCS index is identical to "MCS_MAX" indicating the final (or maximum) MCS index of the MCS table that is being currently tested may be made. For example, when the first MCS table T_64MCS of FIG. 3A and the second MCS table T_256MCS of FIG. 4A are tested, a value of "MCS_MAX" may be 31. When the current MCS index has not reached the final MCS index yet, a next MCS index may be set in operation S52_6. For example, as illustrated in FIG. 5B, "MCS_IDX" may be increased by 1 in operation S52_6.

When the current MCS index is the final MCS index of the MCS table, "THR_MAX" and "MCS_THR" at the current SNR may be recorded in operation S52_7. That is, in operation S52_7, "THR_MAX" may indicate the maximum throughput in the current MCS table and at the current SNR, and "MCS_THR" may indicate the MCS index for providing the maximum throughput in the current MCS table and at the current SNR.

Referring to FIG. 5C, an MCS table to be adjusted based on the test result of FIG. 5A may be detected. That is, according to the test result, the fact that the MCS according to a certain MCS index of the MCS table does not provide an optimum throughput may be detected, and the MCS table may be adjusted accordingly.

In operation S54, test results of two or more MCS tables may be compared with each other. For example, as illustrated in FIGS. 6A to 6C, the maximum throughputs provided by the MCS tables at common SNRs may be detected, respectively, and the detected maximum throughputs may be compared with each other at respective one of corresponding SNRs.

In operation S55, the MCS table to be adjusted may be detected. For example, in operation S54, two test results corresponding to two arbitrary MCS tables, respectively, may be compared to each other, and an SNR at which a modulation scheme having a high modulation order in one MCS table provides a lower throughput than a modulation order having a low modulation order in another MCS table may be detected. That is, at the detected SNR, the MCS index determining the modulation scheme having the high modulation order may not provide the optimum throughput. Accordingly, the MCS index and the MCS table including the same may be desired to be adjusted. According to the methods of FIGS. 5A to 5C, the first MCS table T_64MCS of FIG. 3A, the second MCS table T_256MCS, an MCS table T_256MCS' of FIG. 7A, and the like may be tested, and some examples of test results will be described with reference to FIGS. 6A to 6C.

Figure 6A:
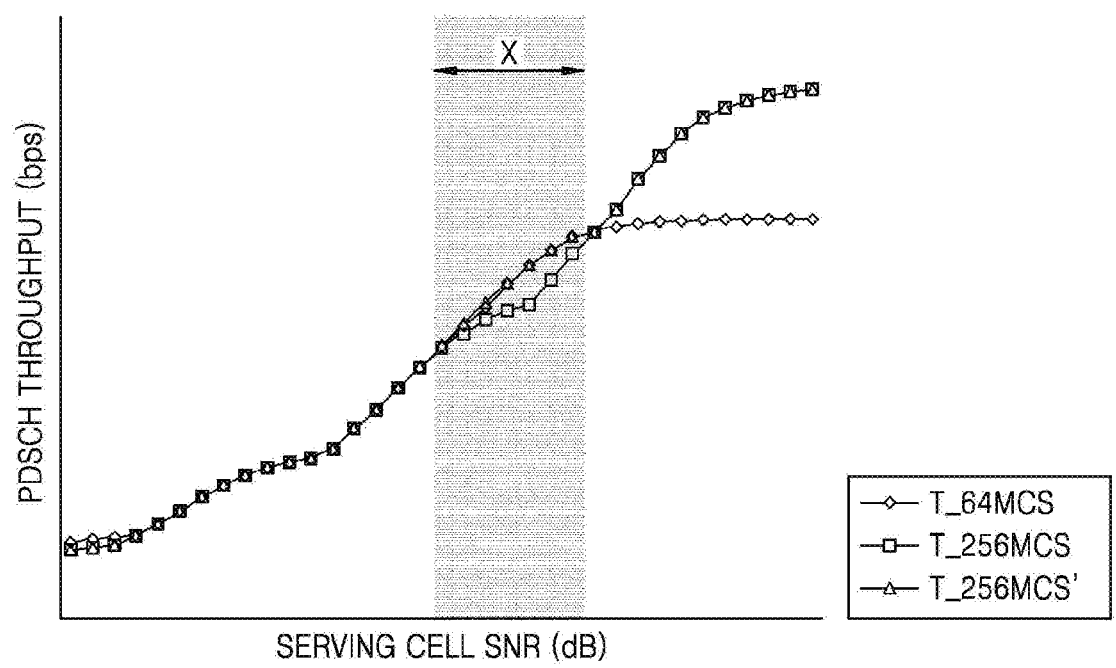
FIGS. 6A to 6C are graphs illustrating throughputs according to a signal-to-noise ratio (SNR) when the tables of FIGS. 3A to 4B are used.
Figure 6B:
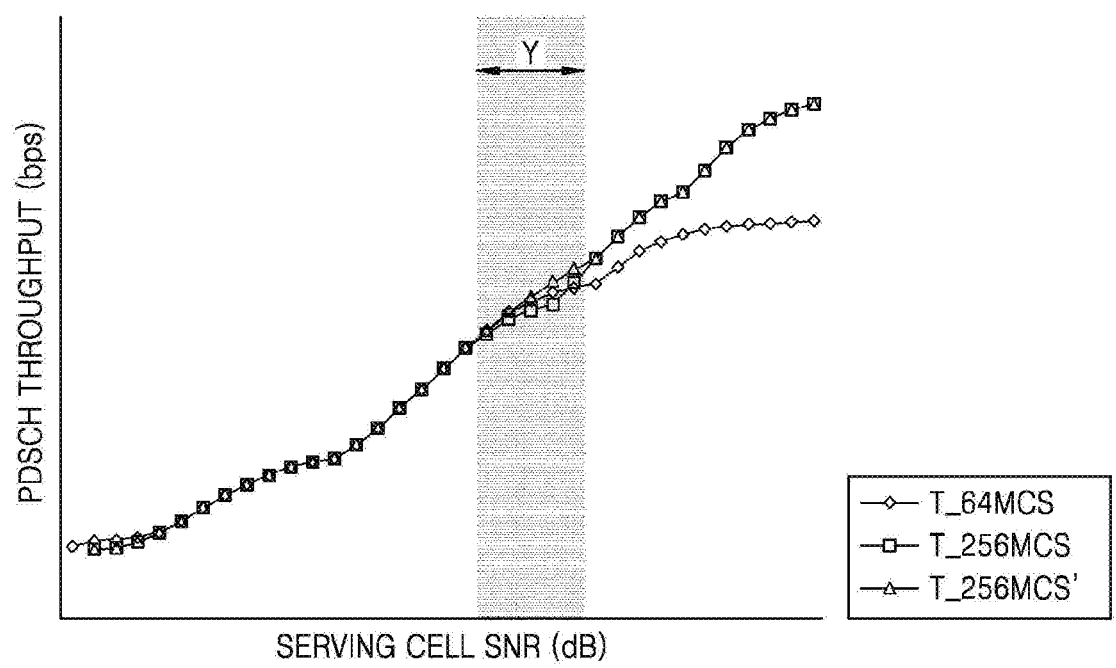
Figure 6C:
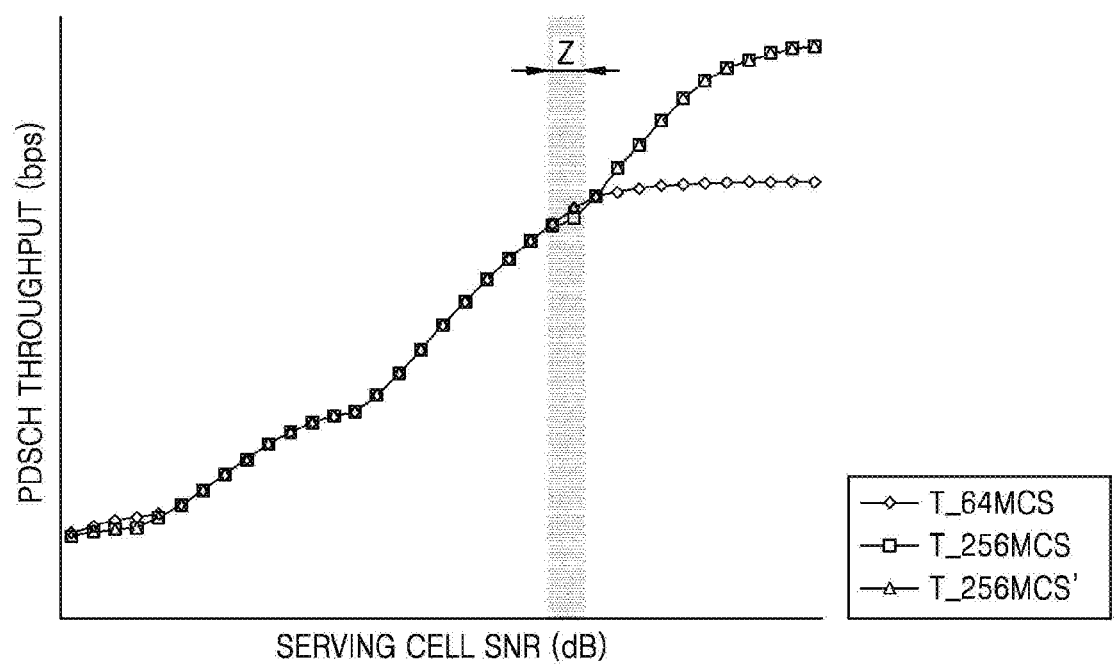

FIGS. 6A to 6C are graphs illustrating throughputs according to an SNR when the tables of FIGS. 3A to 4B are used. For example, FIG. 6A illustrates a throughput when a Control Format Indicator (CFI) is 1, FIG. 6B illustrates a throughput when a CFI is 2, and FIG. 6C illustrates a throughput when a CFI is 3. For example, the graphs of FIGS. 6A to 6C may be derived from a method of testing the throughputs based on the MCS tables of FIGS. 5A to 5C.

As illustrated in FIG. 6A, when the CFI is 1, in an SNR region "X", a throughput provided when the second MCS table T_256MCS is used may be lower than a throughput provided when the first MCS table T_64MCS is used. As illustrated in FIG. 6B, when the CFI is 2, in an SNR region "Y", the throughput provided when the second MCS table T_256MCS is used may be lower than the throughput provided when the first MCS table T_64MCS is used. Further, as illustrated in FIG. 6C, when the CFI is 3, in an SNR region "Z", the throughput provided when the second MCS table T_256MCS is used may be lower than the throughput provided when the first MCS table T_64MCS is used. As described above, in a certain SNR region, the second MCS table T_256MCS supporting a modulation scheme having a relatively high modulation order may provide a lower throughput than the first MCS table T_64MCS supporting a modulation scheme having a relatively low modulation order. As illustrated in FIGS. 6A to 6C, however, a modulation scheme determined according to an example embodiment may provide a higher throughput in a certain SNR region when a new MCS table T_256MCS' is used than when the second MCS table T_256MCS is used.

FIG. 7A is the MCS table T_256MCS' included in MCS tables 151 and 251 of FIG. 1, according to an example embodiment, and FIG. 7B is a CQI table T_256CQI' corresponding to the MCS table T_256MCS' of FIG. 7A. In the disclosure, the MCS table T_256MCS' of FIG. 7A may be referred to as a third MCS table or a new MCS table, and the CQI table T_256CQI' of FIG. 7B may be referred to as a third CQI table or a new CQI table.

Referring to FIG. 7A, the third MCS table T_256MCS' may include MCS indices 0 to 31 expressed in 5 bits. The MCS indices 0 to 27 of the third MCS table T_256MCS' may be used for initial HARQ transmission, and the MCS indices 28 to 31 may be used for HARQ retransmission. Similar to the second MCS table T_256MCS of FIG. 4A, each of the MCS indices 0 to 31 of the third MCS table T_256MCS' may correspond to one of four different modulation schemes, for example, QPSK, 16 QAM, 64QAM, and 256 QAM. Thus, the third MCS table T_256MCS' may support up to 256 QAM.

According to an example embodiment of the inventive concepts, the third MCS table T_256MCS' may include less MCS indices corresponding to 256 QAM than the second MCS table T_256MCS. As described above with reference to FIGS. 6A to 6C, in a certain SNR region, the modulation scheme having the high modulation order may provide a lower throughput than the modulation scheme having the low modulation order. Thus, the third MCS table T_256MCS' may be configured to include less MCS indices corresponding to 256 QAM than the second MCS table T_256MCS so as to decrease the modulation order in the certain SNR region. For example, the MCS indices 20 to 23 of the third MCS table T_256MCS' may correspond to 256 QAM, and as illustrated in FIG. 7A, the MCS indices 11 to 19 of the third MCS table T_256MCS' may correspond to 64 QAM. Also, as illustrated in FIG. 7A, the MCS indices 20 to 23 of the third MCS table T_256MCS' may correspond to TBS indices which are identical to the MCS indices 20 to 23 of the second MCS table T_256MCS, respectively.

Referring to FIG. 7B, the third CQI table T_256CQI' may include CQI indices 0 to 15 expressed in 4 bits. Similar to the second CQI table T_256CQI of FIG. 4B, each of the CQI indices 1 to 15 of the third CQI table T_256CQI' of FIG. 7B may correspond to one of four different modulation schemes, for example, QPSK, 16 QAM, 64 QAM, and 256 QAM, and the CQI indices 1 to 15 may correspond to 15 different transmission efficiencies, respectively. Thus, the third CQI table T_256CQI' corresponding to the third MCS table T256MCS' may support up to 256 QAM.

Similar to the fact that the third MCS table T_256MCS' includes less MCS indices corresponding to 256 QAM than the second MCS table T_256MCS, the third CQI table T_256CQI' may include less CQI indices corresponding to 256 QAM than the second CQI table T_256CQI. For example, the CQI index 12 of the second CQI table T_256CQI may correspond to 256 QAM, whereas as illustrated in FIG. 7B, the CQI index 12 of the third CQI table T_256CQI' may correspond to 64 QAM. Also, as illustrated in FIG. 7B, the CQI index 12 of the third CQI table T_256CQI' may correspond to a higher code rate than the CQI index 12 of the second CQI table T_256CQI. In some example embodiments, the CQI index 12 of the third CQI table T_256CQI' may correspond to the same code rate as the CQI index 12 of the second CQI table T_256CQI.

As illustrated in FIGS. 6A to 6C, when the third MCS table T_256MCS' and the third CQI table T_256CQI' are used, an increased throughput may be provided compared to when the second MCS table T_256MCS and the second CQI table T_256CQI are used.

Figure 8:
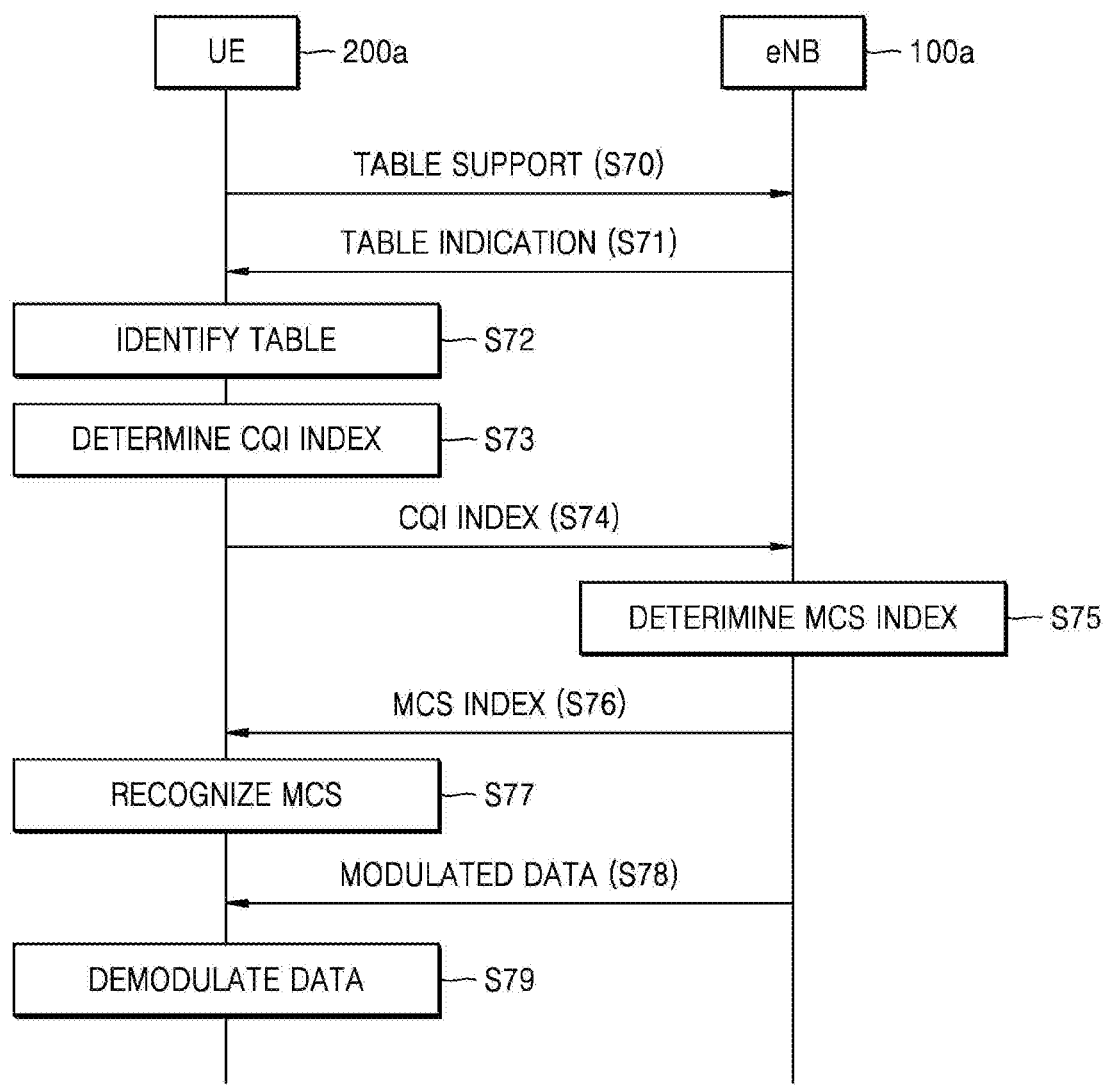
FIG. 8 is a flowchart of a wireless communication method using the tables of FIGS. 7A and 7B, according to an example embodiment.

FIG. 8 is a flowchart of a wireless communication method using the third MCS table T_256MCS' and the third CQI table T_256CQI' of FIGS. 7A and 7B, according to an example embodiment. It is assumed that an eNB 100a and UE 200a of FIG. 8 include the first to third MCS tables T_64MCS, T_256MCS, and T_256MCS' and the first to third CQI tables T_64CQI, T_256CQI, and T_256CQI'. That is, in order to support legacy UE and legacy eNB, the eNB 100a and the UE 200a may include the third MCS table T_256MCS' and the third CQI table T_256CQI' as well as the first and second MCS tables T_64MCS and T_256MCS and the first and second CQI tables T_64CQI and T_256CQI.

Referring to FIG. 8, in operation S70, table support information may be transmitted from the UE 200a to the eNB 100a. For example, the eNB 100a and the UE 200a may perform a capability negotiation in order to negotiate whether to support the third MCS table T_256MCS' after initial access. The UE 200a may transmit to the eNB 100a the table support information indicating availability of the third MCS table T_256MCS'. In some example embodiments, the UE 200a may transmit to the eNB 100a one or more high layer signals (e.g., MAC signals and/or RRC signals) including the table support information.

In operation S71, table indication information may be transmitted from the eNB 100a to the UE 200a. For example, the eNB 100a may transmit table indication information indicating one of the first to third MCS tables T_64MCS, T_256MCS, and T_256MCS'. In operation S70, because the table support information indicating the support for the third MCS table T_256MCS' is received from the UE 200a, the eNB 100a may transmit to the UE 200a table indication information indicating the third MCS table T_256MCS'. In some example embodiments, the eNB 100a may transmit one or more physical layer signals (e.g., PDCCH signals and/or EPDCCH signals) including the table indication information, and in some example embodiments, the eNB 100a may transmit the one or more high layer signals (e.g., MAC signals, and/or RRC signals) including the table indication information to the UE 200a.

In operation S72, the UE 200a may identify a table based on the table indication information. For example, the UE 200a may identify one of the first to third MCS tables T_64MCS, T_256MCS, and T_256MCS' based on the table indication information. When both the eNB 100a and the UE 200a support the third MCS table T_256MCS', the UE 200a may identify the third MCS table T_256MCS' according to the table indication information indicating the third MCS table T_256MCS'. Accordingly, the UE 200a may subsequently recognize that an MCS index received from the eNB 100a is included in the third MCS table T_256MCS'.

In operation S73, the UE 200a may determine a CQI index. For example, the eNB 100a may transmit to the UE 200a, PDCCH signals or EPDCCH signals in order to obtain the channel state of the DL 14. A CSI request field may be included in the PDCCH or EPDCCH signals, and the CSI request field may include information used to indicate a periodical or aperiodical CSI request. In response to the CSI request field, the UE 200a may measure the channel state of the DL 14. Based on the measured channel state, the UE 200a may select a CQI index appropriate or desirable for the third CQI table T_256CQI'.

In operation S74, the CQI index may be transmitted from the UE 200a to the eNB 100a. For example, the UE 200a may transmit the CQI index selected from the identified CQI table to the eNB 100a. In some example embodiments, the UE 200a may transmit one or more physical layer signals (e.g., PUCCH or PUSCH signals) including the CQI index.

In operation S75, the eNB 100a may determine an MCS index. For example, based on the CQI index received from the UE 200a, the eNB 100a may calculate an appropriate or desirable modulation scheme and code rate and may determine the MCS index corresponding to the calculated modulation scheme and code rate by referring to the third MCS table T_256MCS'.

In operation S76, the MCS index may be transmitted from the eNB 100a to the UE 200a. The MCS index transmitted from the eNB 100a may be an MCS index included in an MCS table based on the table indication information in operation S71. Because the UE 200a also identifies the table in operation S72, the UE 200a may recognize that the MCS index received from the eNB 100a is included in the identified MCS table. In some example embodiments, the eNB 100a may transmit the one or more physical layer signals (e.g., PDCCH signals and/or EPDCCH signals) including the MCS index.

In operation S77, the UE 200a may recognize the MCS. That is, the UE 200a may derive a modulation scheme and a transmission block size (TBS) corresponding to the MCS index received in operation S76 from the MCS table identified in operation S72. For example, when the UE 200a identifies the third MCS table T_256MCS' and receives one of the MCS indices 20 to 23 from the eNB 100a, the UE 200a may derive 64 QAM instead of 256 QAM.

In operation S78, the eNB 100a may transmit modulated data to the UE 200a. The eNB 100a may modulate downlink data (e.g., DL-SCH signals) according to a table indication transmitted to the UE 200a in operation S71 as well as the modulation scheme and the TBS according to the MCS index transmitted to the UE 200a in operation S76.

In operation S79, the UE 200a may demodulate the data received from the eNB 100a. The UE 200a may demodulate the data received from the eNB 100a according to the modulation scheme corresponding to the MCS index identified in operation S77.

FIG. 9 illustrates an example of the table support information transmitted from the UE 200a in operation S70 of FIG. 8, according to an example embodiment. As described above with reference to FIG. 8, the table support information may indicate the support for the third MCS table T_256MCS', and the UE 200a may transmit to the eNB 100a the one or more high layer signals including the table support information, for example, MAC signals and/or RRC signals. Hereinafter, the example of FIG. 9 will be described with reference to FIG. 8.

Referring to FIG. 9, "dl-256 QAM-r14A" may indicate availability of the support for the second MCS table T_256MCS. "dl-256 QAM-r14B" may indicate availability of the support for the third MCS table T_256MCS' in some example embodiments, and may indicate availability of the support for both the second and third MCS tables T_256MCS and T_256MCS' in some other example embodiments.

The one or more high layer signals illustrated in FIG. 9 and those in the following drawings are non-limiting examples, and example embodiments of the inventive concepts are not limited to the titles illustrated in FIG. 9 and the following drawings and to a version of 3GPP LTE Release. In some example embodiments, other pieces of information other than the information illustrated in FIG. 9 and the following drawings may be additionally combined with the one or more high layer signals.

FIGS. 10A and 10B illustrate examples of the table indication information transmitted from the eNB 100a in operation S71 of FIG. 8, according to some example embodiments. As described above with reference to FIG. 8, the table indication information may indicate one of the first to third MCS tables T_64MCS, T_256MCS, and T_256MCS', and the eNB 100a may transmit to the UE 200a one or more high layer signals (e.g., the MAC signals and/or the RRC signals) including the table indication information. Hereinafter, the examples of FIGS. 10A and 10B will be described with reference to FIG. 8.

Referring to FIG. 10A, "tbsIndexAlt-r14" of FIG. 10A may indicate one of the first to third MCS tables T_64MCS, T_256MCS, and T_256MCS'. For example, a value "tbsIndexAlt-r14" may be one of "a26" indicating the first MCS table T_64MCS, "a33" indicating the second MCS table T_256MCS, and "a33b" indicating the third MCS table T_256MCS'. In some example embodiments, "tbsIndexAlt-r14" may indicate applicability of alternative TBS indices 26 and 33 to all sub-frames that are scheduled by a DCI format 2C or 2D. For example, "a26" may indicate an alternative TBS index 26A, "a33" may indicate an alternative TBS index 33A, and "a33b" may indicate an alternative TBS index 33A in the third MCS table T_256MCS'. In some example embodiments, when "tbsIndexAlt-r14" is not set, the UE 200a may use the TBS indices 26 and 33 for all of the sub-frames. The TBS indices 26 and 33 in the Table 7.1.7.2.1-1 specified in European Telecommunications Standards institute (ETSI) TS 136.213.

Referring to FIG. 10B, because the one or more high layer signals for distinguishing the first MCS table T_64MCS and the second MCS table T_256MCS have been defined, the eNB 100a may transmit to the UE 200a the one or more high layer signals for distinguishing the first MCS table T_64MCS and the third MCS table T_256MCS' from each other. That is, the second MCS table T_256MCS may be replaced with the third MCS table T_256MCS'. For example, a value of "tbsIndexAlt-r14" of FIG. 10B may be either "a26" indicating the first MCS table T_64MCS or "a33b" indicating the third MCS table T_256MCS'.

FIG. 11 illustrates an example of the table indication information transmitted from the eNB 100a in operation S71 of FIG. 8, according to an example embodiment. As described above with reference to FIG. 8, the table indication information may indicate one of the first to third MCS tables T_64MCS, T_256MCS, and T_256MCS', and the eNB 100a may transmit to the UE 200a the one or more high layer signals (e.g., the PDCCH signals and/or the EPDCCH) including the table indication information.

According to some example embodiments of the inventive concepts, unlike the examples of FIGS. 10A and 10B in which the one or more high layer signals are used, the eNB 100a may transmit to the UE 200a the table indication information based on the DCI of the PDCCH signals and/or the EPDCCH signals. In some example embodiments, the eNB 100a may transmit DCI including a 1-bit MCS table indicator. The MCS table indicator may indicate the first MCS table T_64MCS (that is, corresponding to "a26") when the MCS table indicator is "0". The MCS table indicator may indicate the third MCS table T_256MCS' (that is, corresponding to "a33b") when the MCS table indicator is "1". In some example embodiments, the eNB 100a may transmit DCI including a 1-bit CQI table indicator. The CQI table indicator may indicate the first CQI table T64_CQI when the CQI table indicator is, for example, "0", and the CQI table indicator may indicate the third CQI table T_256CQI' when the CQI table indicator is "1." In some example embodiments, the eNB 100a may transmit DCI including both the MCS table indicator and the CQI table indicator. Accordingly, the MCS table may be dynamically replaced quickly at intervals of, for example, about 1 ms. The MCS table indicator and/or the CQI table indicator may be irrelevant to a DCI format.

Referring to FIG. 11, the eNB 100a may transmit one or more high layer signals regarding whether the DCI includes the table indication information (e.g., one or more high layer signals including table variable information indicating validity of the table indication information). For example, as illustrated in FIG. 11, "DynamicMCS -r14" may indicate whether the DCI includes indication information regarding the MCS table. For example, a value of "DynamicMCS -r14" may be one of "static" indicating that the DCI does not include the indication information regarding the MCS table and "dynamic" indicating that the DCI includes the indication information regarding the MCS table. Further, "DynamicCQI -r14" may indicate whether the DCI includes indication information regarding the CQI table. For example, a value of "DynamicCQI -r14" may be one of "static" indicating that the DCI does not include the indication information regarding the CQI table and "dynamic" indicating that the DCI includes the indication information regarding the CQI table. The UE 200*a* may identify one of the first to third MCS tables T_64MCS, T_256MCS, and T_256MCS' by using or ignoring the table indication information included in the DCI based on the table variable information.

Figures 12A, 12B:
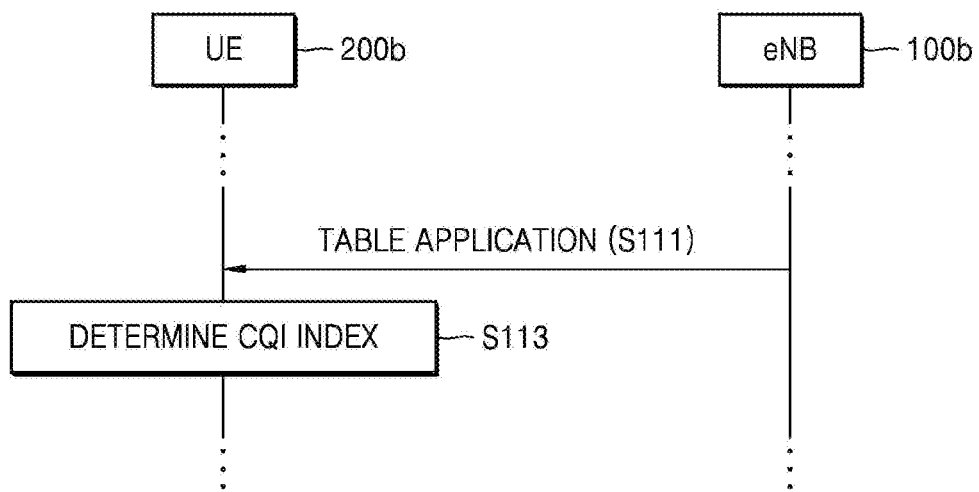
FIG. 12A illustrates an example of an operation of transmitting table application information from a base station to user equipment, according to an embodiment.
FIG. 12B illustrates an example of the table application information of FIG. 12A, according to an example embodiment.

FIG. 12A illustrates an example of an operation of transmitting table application information from an eNB 100*b* to UE 200*b*, according to an example embodiment. FIG. 12B illustrates an example of the table application information of FIG. 12A, according to an example embodiment. As described above with reference to FIG. 8, the eNB 100*b* may transmit the table indication information to the UE 200*b*, and accordingly, the MCS table used by the eNB 100*b* and the UE 200*b* as well as the CQI table corresponding to the MCS table may be determined.

Referring to FIG. 12A, in operation S111, the table application information may be transmitted from the eNB 100*b* to the UE 200*b*. The table application information may indicate a range in which the CQI table identified by the UE 200*b* is applied. The UE 200*b* may determine a CQI index based on the table application information received from the eNB 100*b*.

Referring to FIG. 12B, "altCQI-Table-r14" may indicate applicability to aperiodic and periodic CSI reporting for a serving cell related to the third CQI table T_256CQI'. For example, a value of "altCQI-Table-r14" may be "allSubframes" indicating that the third CQI table T_256CQI' is applied to all sub-frames and CSI processes, "csi-SubframeSet1" indicating that the third CQI table T_256CQI' is applied to a first CQI sub-frame set, and "csi-SubframeSet2" indicating that the third CQI table T_256CQI' is applied to a second CQI sub-frame set.

In the LTE, various transmission methods using multiple antennas may be defined and may be referred to as transmission modes. When the transmission mode, that is, "transmissionMode", may be set only in a range "tm1" to "tm9", "csi-SubframeSet1" or "csi-SubframeSet2" may be set, and "csi-SubframeSet1" and "csi-SubframeSet2" may report the CQI when signals are set as high layer signals. In some example embodiments, "SubframePatternConfig-r10" (not shown) may be set with regard to a concerned serving cell, and different CQI tables may be applied to two sets of CSI sub-frames, respectively. In this case, "SubframePatternConfig-r10" may indicate signals for allowing different CQI tables to be applied to "csi-SubframeSet1" and "csi-SubframeSet2," respectively. In some example embodiments, EUTRAN may set "altCQI-Table-r14" as "allSubframes." In some example embodiments, when "altCQI-Table-r14" is not set, the UE 200*b* may use the first CQI table T_64CQI for all sub-frames and during all CSI processes.

Figures 13A, 13B:
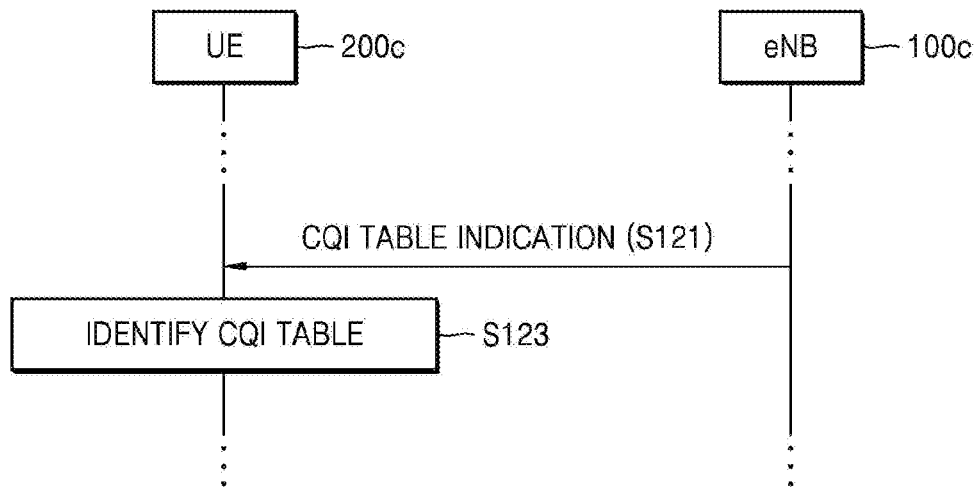
FIG. 13A illustrates an example of an operation of transmitting CQI table indication information from a base station to user equipment, according to an example embodiment.
FIG. 13B illustrates an example of the CQI table indication information of FIG. 13A, according to an example embodiment.

FIG. 13A illustrates an example of an operation of transmitting CQI table indication information from an eNB 100*c* to UE 200*c*, according to an example embodiment. FIG. 13B illustrates an example of the CQI table indication information of FIG. 13A, according to an example embodiment. As described above with reference to FIG. 8, the eNB 100*c* may transmit the CQI table indication information to the UE 200*c*, and accordingly the MCS table that the eNB 100*b* and the UE 200*b* use may be determined.

Referring to FIG. 13A, in operation S121, the eNB 100*c* may transmit to the UE 200*c* the CQI indication information used to explicitly indicate the CQI table. That is, in some example embodiments, the table indication information of FIG. 8 may include both the MCS table indication information and the CQI table indication information.

In operation S123, the UE 200*c* may identify the CQI table based on the received CQI table indication information. For example, the UE 200*c* may identify one of the first to third CQI tables T_64CQI, T_256CQI, and T_256CQI', based on the received CQI table indication information.

Referring to FIG. 13B, "altCQI-r14" may indicate applicability to aperiodic and periodic CSI reporting for a serving cell related to the second CQI table T_256CQI and the third CQI table T_256CQI'. For example, as a value of "altCQI-r14" may be "A" indicating the second CQI table T_256CQI, and "B" indicating the third CQI table T_256CQI'. In some example embodiments, when "altCQI-r14" is set, the UE 200*c* may use the first CQI table T_64CQI for all sub-frames and during the CSI processes.

In some example embodiments, the CQI table indication information may include the table application information. For example, as illustrated in FIG. 13B, the CQI table indication information may include "altCQI-r14" and "altCQI-Table-r14." Referring to FIG. 13B, "altCQI-Table-r14" may indicate applicability of the CQI table indicated by "altCQI-r14". As described above with reference to FIGS. 12A and 12B, the table indication information may indicate the range in which the CQI table identified by the UE 200*b* is applied.

Figure 14:
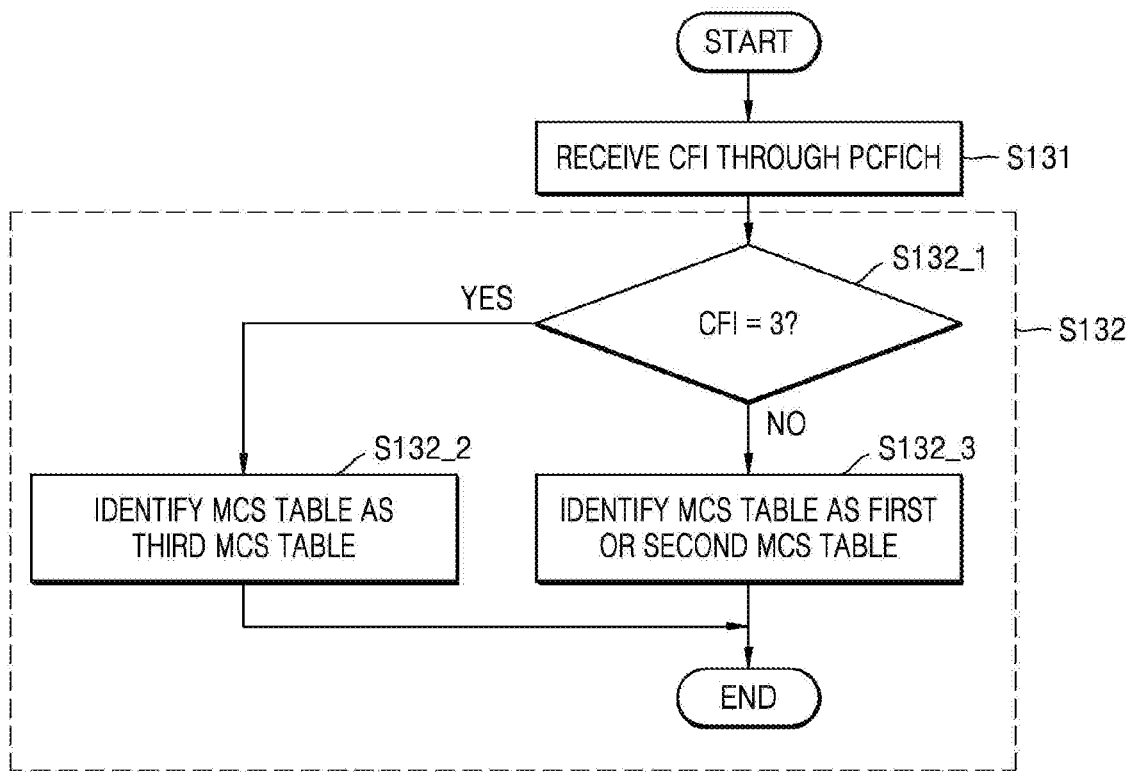
FIG. 14 is a flowchart of an example of an operation in which user equipment identifies an MCS table, according to an example embodiment.

FIG. 14 is a flowchart of an example of an operation in which UE identifies the MCS table, according to an example embodiment. For example, the UE may use CFI as table indication information used to identify the MCS table and may identify the MCS table based on a value of the CFI. For example, the table indication information of FIG. 14 may include the CFI. Operation S131 of FIG. 14 may be included in operation S71 of FIG. 8, and operation S132 of FIG. 14 may be included in operation S72 of FIG. 8. Hereinafter, the example of FIG. 14 may be described with reference to FIG. 8.

Referring to FIG. 14, in operation S131, the CFI may be received through a PCFICH. As described above with reference to FIG. 2, the CFI may indicate a size of the control region and may have values of 1 to 3. As illustrated in FIGS. 6A to 6C, SNR regions (e.g., X, Y, and Z) where 256 QAM provides a lower transmission rate than 64 QAM may differ according to the values of the CFI, and accordingly the UE 200*a* may use the values of the CFI to identify the MCS table. The UE 200*a* may identify the MCS table according to the determined values of the CFI.

In operation S132, the MCS table may be identified based on the CFI. As illustrated in FIG. 14, operation S132 may include multiple operations S132_1, S132_2, and S132_3. Operation S132 described below is merely an example, and in some example embodiments, the UE 200*a* may identify the MCS table differently from the illustration of FIG. 14, according to the values of the CFI.

In operation S132_1, a determination as to whether the CFI is 3 may be made. When the CFI is 3, in operation S132_2, the UE 200*a* may identify the MCS table as the third MCS table T_256MCS'. When the CFI is not 3, the UE 200*a* may identify the MCS table as the first and second MCS tables T_64MCS and table T_256MCS, in operation S132_3.

FIG. 15 is a flowchart of an example of an operation in which the UE 200*a* identifies the CQI table, according to an example embodiment. For example, operation S142 of FIG. 15 may be included in operation S72 of FIG. 8. Operation S142 of FIG. 15, in which the CQI table is identified, may include operations S142_1 to S142_4, and hereinafter, the example of FIG. 15 will be described with reference to FIG. 8.

Referring to FIG. 15, in operation S142_1, a code rate of data may be calculated. The UE 200a may calculate the code rate of the data and may use the calculated code rate to identify the CQI table.

In operation S142_2, the code rate of the data may be compared with a desired or preset reference value. When the code rate exceeds the reference value, the UE 200a may identify the CQI table as the third CQI table T_256CQI', in operation S142_3. When the code rate does not exceed the reference value, the UE 200a may identify the CQI table as the first CQI table T_64CQI, in operation S142_4. Accordingly, when the code rate of the data is relatively low, the first CQI table T_64CQI supporting up to 64 QAM may be used, but when the code rate is relatively high, the third CQI table T_256CQI' supporting up to 256 QAM may be used.

Figure 16A:
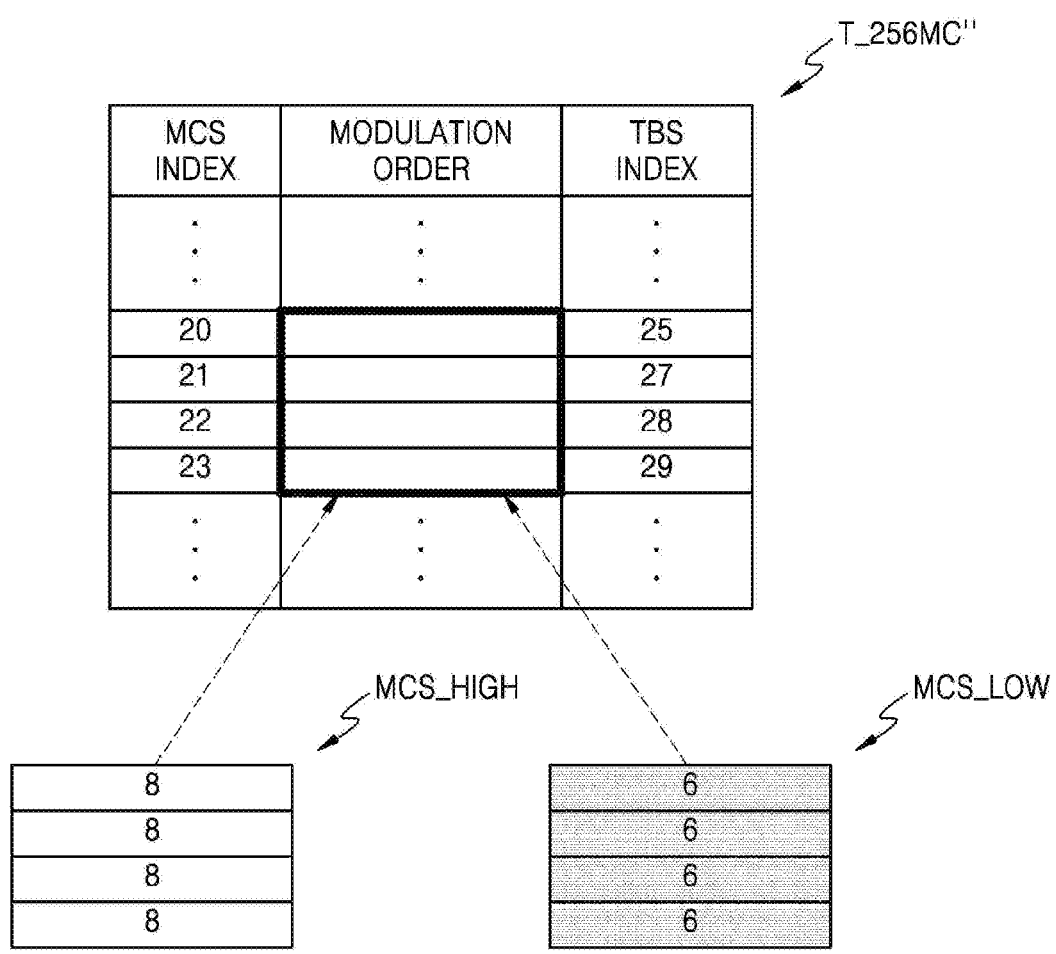
FIG. 16A schematically illustrates an operation of changing an MCS table, according to an example embodiment.
Figure 16B:
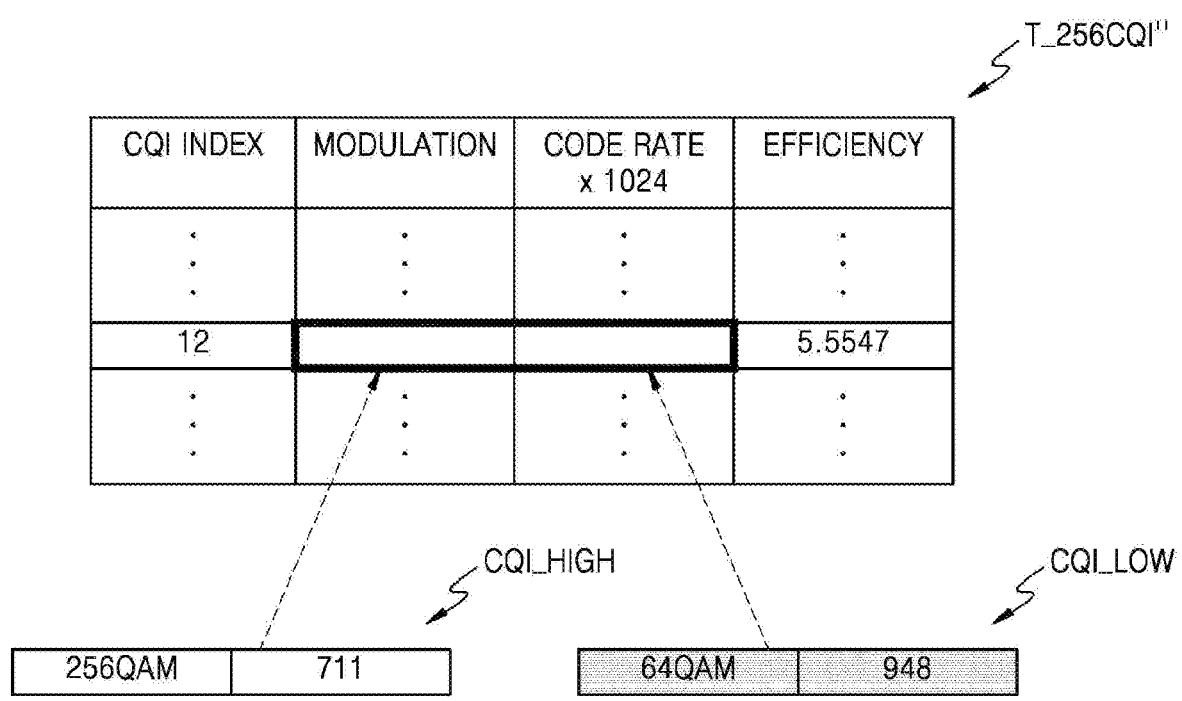
FIG. 16B illustrates an operation of changing a CQI table according to an example embodiment.

FIG. 16A schematically illustrates an operation of changing an MCS table T_256MCS", according to an example embodiment. FIG. 16B illustrates an operation of changing a CQI table T_256CQI" according to an example embodiment. According to an example embodiment, UE may change modulation orders of the MCS table T_256MCS" and the CQI table T_256CQI", which support up to 256 QAM, according to indications from the eNB, instead of including the third MCS table T_256MCS' and the third CQI table T_145CQI'. In the present disclosure, the MCS table T_256MCS" of FIG. 16A may be referred to as a fourth MCS table, and the CQI table T_256CQI" of FIG. 16B may be referred to as a fourth CQI table.

Referring to FIG. 16A, the modulation schemes corresponding to the MCS indices 20 to 23 may change in the fourth MCS table T_256MCS". That is, as illustrated in FIG. 16A, the modulation schemes corresponding to the MCS indices 20 to 23 in the fourth MCS table T_256MCS" may be filled with high modulation orders MCS_HIGH corresponding to 256 QAM or with low modulation orders MCS_LOW corresponding to 64 QAM. As will be described below with reference to FIG. 17, UE 200d may fill the fourth MCS table T_256MCS" with the high modulation orders MCS_HIGH or low modulation orders MCS_LOW, based on downward indication information and upward indication information which are received from an eNB 100d.

In some example embodiments, the fourth MCS table T_256MCS" may be identical to the second MCS table T_256MCS in an initial state. That is, in the fourth MCS table T_256MCS," the MCS indices 20 to 23 may each correspond to 256 QAM by default. Then, at least some of the MCS indices 20 to 23 may each correspond to 64 QAM in response to the downward indication information received from the eNB, and to 256 QAM in response to the upward indication information received from the eNB. In other words, the UE may selectively recognize 64 QAM when the second MCS table T_256MCS is identified and the MCS indices correspond to 256 QAM.

Referring to FIG. 16B, similar to the fourth MCS table T_256MCS", in the fourth CQI table T_256CQI", a modulation scheme and a code rate corresponding to a CQI index 12 may change. That is, as illustrated in FIG. 16B, the modulation scheme corresponding to the CQI index 12 in the fourth CQI table T_256CQI" may have a relatively low code rate and may be filled with high modulation orders CQI_HIGH corresponding to 256 QAM. In some example embodiments, the modulation scheme may have a relatively high code rate and may be filled with low modulation orders CQI_LOW corresponding to 64 QAM.

In some example embodiments, the fourth CQI table T_256CQI" may be identical to the second CQI table T_256CQI in an initial state. That is, in the fourth CQI table T_256CQI", the CQI index 12 may correspond to 256 QAM by default. The CQI index 12 may correspond to 64 QAM in response to the downward indication information received from the eNB, and to 256 QAM in response to the upward indication information received from the eNB.

Figure 17:
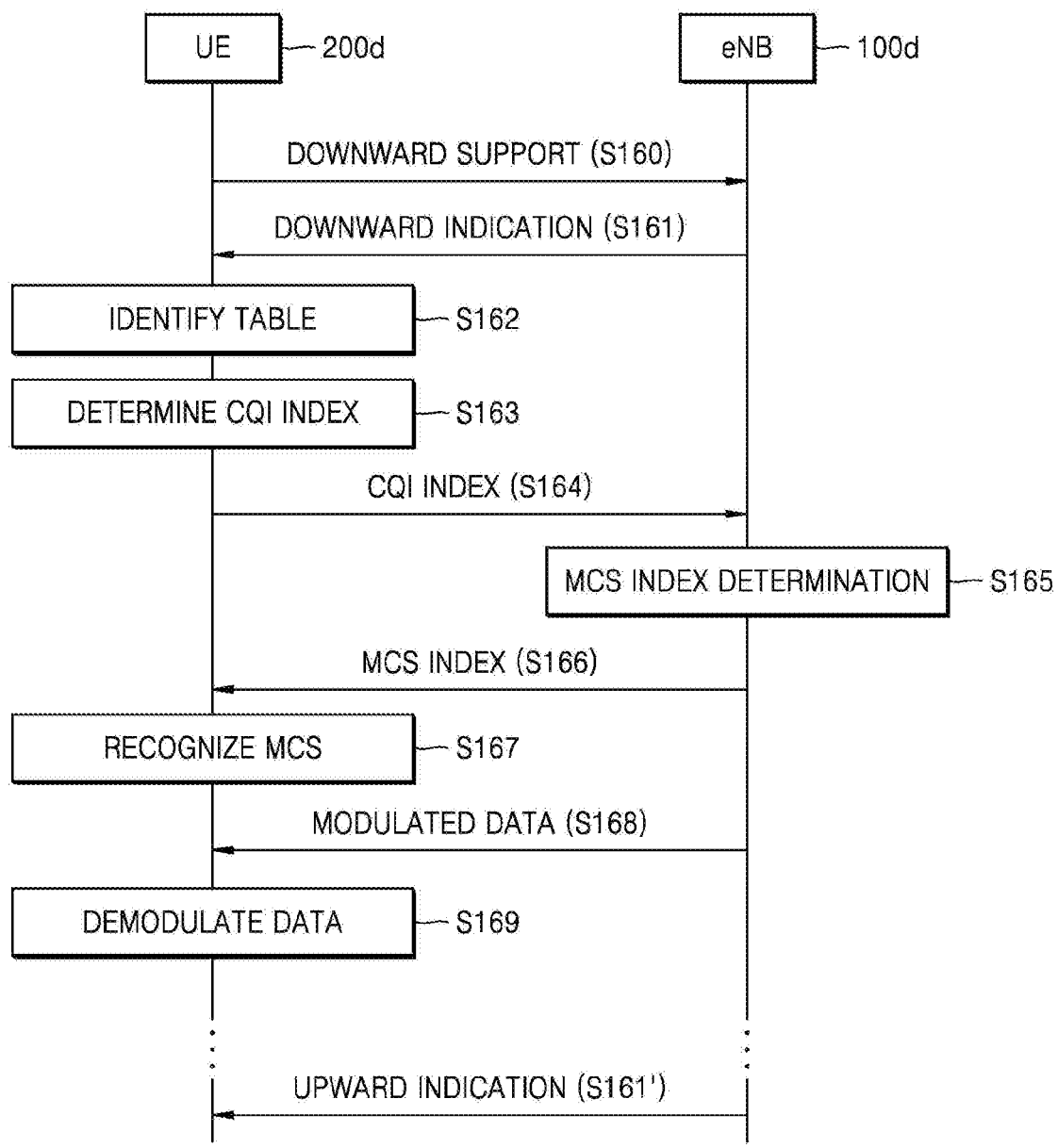
FIG. 17 is a flowchart of a wireless communication method using the MCS table of FIG. 16A, according to an example embodiment.

FIG. 17 is a flowchart of a wireless communication method using the fourth MCS table T_256MCS" of FIG. 16A, according to an example embodiment. It is assumed that the eNB 100d and the UE 200d of FIG. 17 include the first and fourth MCS tables T_64MCS and T_256MCS" and the first and fourth CQI tables T_64CQI and T_64CQI." That is, the eNB 100d and the UE 200d may include the first MCS table T_64MCS and the first CQI table T_64CQI in order to support the legacy UE and the legacy eNB. In an initial state, the fourth MCS table T_256MCS" may be identical to the second MCS table T_256MCS, and the fourth CQI table T_256CQI" may be identical to the second CQI table T_256CQI. Hereinafter, the flowchart of FIG. 17 will be described with reference to FIGS. 16A and 16B, and the descriptions previously provided with reference to FIG. 8 will not be repeated.

Referring to FIG. 17, in operation S160, downward support information may be transmitted from the UE 200d to the eNB 100d. For example, after initial access, the UE 200d may perform a capability negotiation with the eNB 100d in order to determine whether to support a downward adjustment of the modulation order according to the second MCS table T_256MCS. The UE 200d may transmit to eNB 100d downward support information indicating availability of the downward adjustment of the second MCS table T_256MCS (or availability of the fourth MCS table T_256MCS", or availability of selective recognition of 64 QAM). In some example embodiments, the UE 200d may transmit to the eNB 100d one or more high layer signals (e.g., MAC signals and/or RRC signals) including the downward support information.

In operation S161, downward indication information may be transmitted from the eNB 100d to the UE 200d. For example, the eNB 100d may transmit to the UE 200d the downward indication information in order to change the fourth MCS table T_256MCS" in such a manner that the fourth MCS table T_256MCS" has the same features as the third MCS table T_256MCS'. The eNB 100d may transmit one or more physical layer signals (e.g., PDCCH signals and/or EPDCCH signals) including the downward indication information in some example embodiments, and the eNB 100d may transmit the one or more high layer signals (e.g., the MAC signal and/or the RRC signals) including the downward indication information to the UE 200d, in some example embodiments.

In operation S162, the UE 200d may identify a table. For example, the UE 200d may fill the fourth MCS table T_256MCS" with the low modulation orders MCS_LOW in response to the downward indication information, and accordingly may identify the fourth MCS table T_256MCS" having the same features as the third MCS table T_256MCS'. Further, the UE 200d may fill the fourth CQI table T_256CQI" with the low modulation orders CQI_LOW in response to the downward indication information, and accordingly may identify the fourth CQI table T_256CQI" having the same features as the third CQI table T_256CQI'.

Unlike the illustration of FIG. 17, when the UE 200d does not receive the downward indication information from the eNB 100d, the UE 200d may receive separate table indication information (e.g., the table indication information of FIG. 8) and may identify, based on the received table indication information, the MCS table as one of the first MCS table T_64MCS and the fourth MCS table T_256MCS" which has the same features as the second MCS table T_256MCS.

In operation S163, the UE 200*d* may determine a CQI index. For example, the UE 200*d* may select a CQI index appropriate or desirable for the fourth CQI table T_256CQI" by measuring the channel state of the DL. Then, in operation S164, the CQI index may be transmitted from the UE 200*d* to the eNB 100*d*.

In operation S165, the eNB 100*d* may determine an MCS index. For example, the eNB 100*d* may determine the MCS index by referring to the fourth MCS table T_256MCS" filled with the low modulation orders MCS_LOW. Then, in operation S166, the MCS index may be transmitted from the eNB 100*d* to the UE 200*d*.

In operation S167, the UE 200*d* may recognize an MCS by referring to the fourth MCS table T_256MCS". Then, in operation S168, modulated data may be transmitted from the eNB 100*d* to the UE 200*d*, and in operation S169, the UE 200*d* may demodulate the data received from the eNB 100*d*.

According to some example embodiments, in operation S161, upward indication information may be transmitted from the eNB 100*d* to the UE 200*d*. For example, the eNB 100*d* may transmit to the UE 200*d* the upward indication information in order to fill the fourth MCS table T_256MCS," which is filled with the low modulation orders MCS_LOW, with the high modulation orders MCS_HIGH, based on the upward indication information transmitted to the UE 200*d* in operation S161. In response to the upward adjustment information received from the eNB 100*d*, the UE 200*d* may fill the fourth MCS table T_256MCS" with the high modulation orders MCS_HIGH and the fourth CQI table T_256CQI" with the high modulation orders CQI_HIGH.

Figure 18:
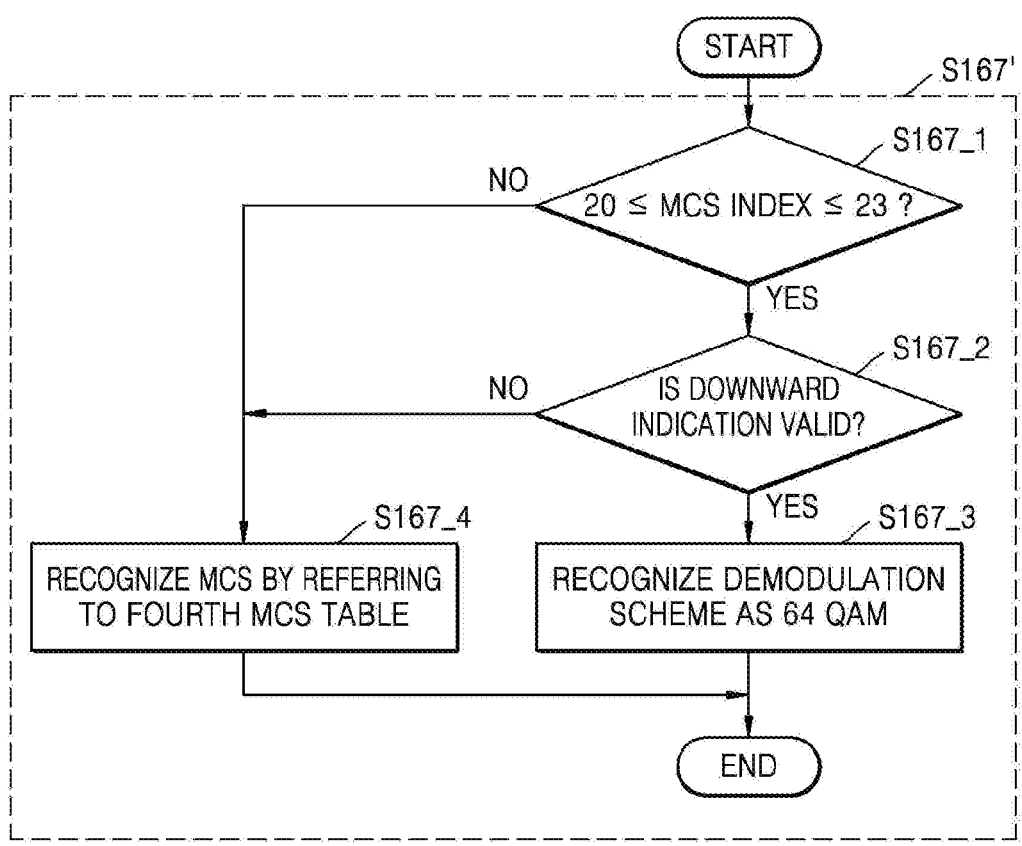
FIG. 18 is a flowchart of an example of operation S167 of FIG. 17, according to an example embodiment.

FIG. 18 is a flowchart of an example of operation S167 of FIG. 17 according to an example embodiment. As described above with reference to FIG. 17, in operation S167' of FIG. 18, the UE 200*d* may identify the MCS based on the identified MCS table and the received MCS index. As illustrated in FIG. 18, operation S167' may include operations S167_1 to S167_4, and hereinafter operation S167' will be descried.

In FIG. 18, instead of changing the fourth MCS table T_256MCS" based on the downward indication information received from the eNB 100*d*, the UE 200*d* may store whether the downward indication information is received from the eNB 100*d* and may subsequently determine whether to change the modulation scheme according to the MCS index received from the eNB 100*d*. That is, in FIG. 18, the fourth MCS table T_256MCS" that the UE 200*d* includes may be the same as the second MCS table T_256MCS.

In operation S167_1, the MCS index may be identified. For example, as illustrated in FIG. 18, the UE 200*d* may determine whether the MCS index received from the eNB 100*d* is included in the MCS indices 20 to 23. When the MCS index received from the eNB 100*d* is not included in the MCS indices 20 to 23, the UE 200*d* may recognize the MCS by referring to the fourth MCS table T_256MCS," in operation S167_4.

When the MCS index received from the eNB 100*d* is included in the MCS indices 20 to 23, the UE 200*d* may determine whether a downward indication is valid, in operation S167_2. For example, the UE 200*d* may determine whether the downward indication is valid according to whether the downward indication information and/or the upward indication information is received from the eNB 100*d* in advance. When the downward indication is invalid, operation S167_4 may be subsequently performed, and when the downward indication is valid, operation S167_3 may be subsequently performed.

In operation S167_3, a modulation scheme may be recognized as 64 QAM. Accordingly, when the downward indication information received from the eNB 100*d* is valid, the UE 200*d* may recognize the modulation scheme corresponding to the MCS indices 20 to 23 as 64 QAM, and thus the fourth MCS table T_256MCS" may produce the same effects as the third MCS table T_256MCS'.

Figure 19:
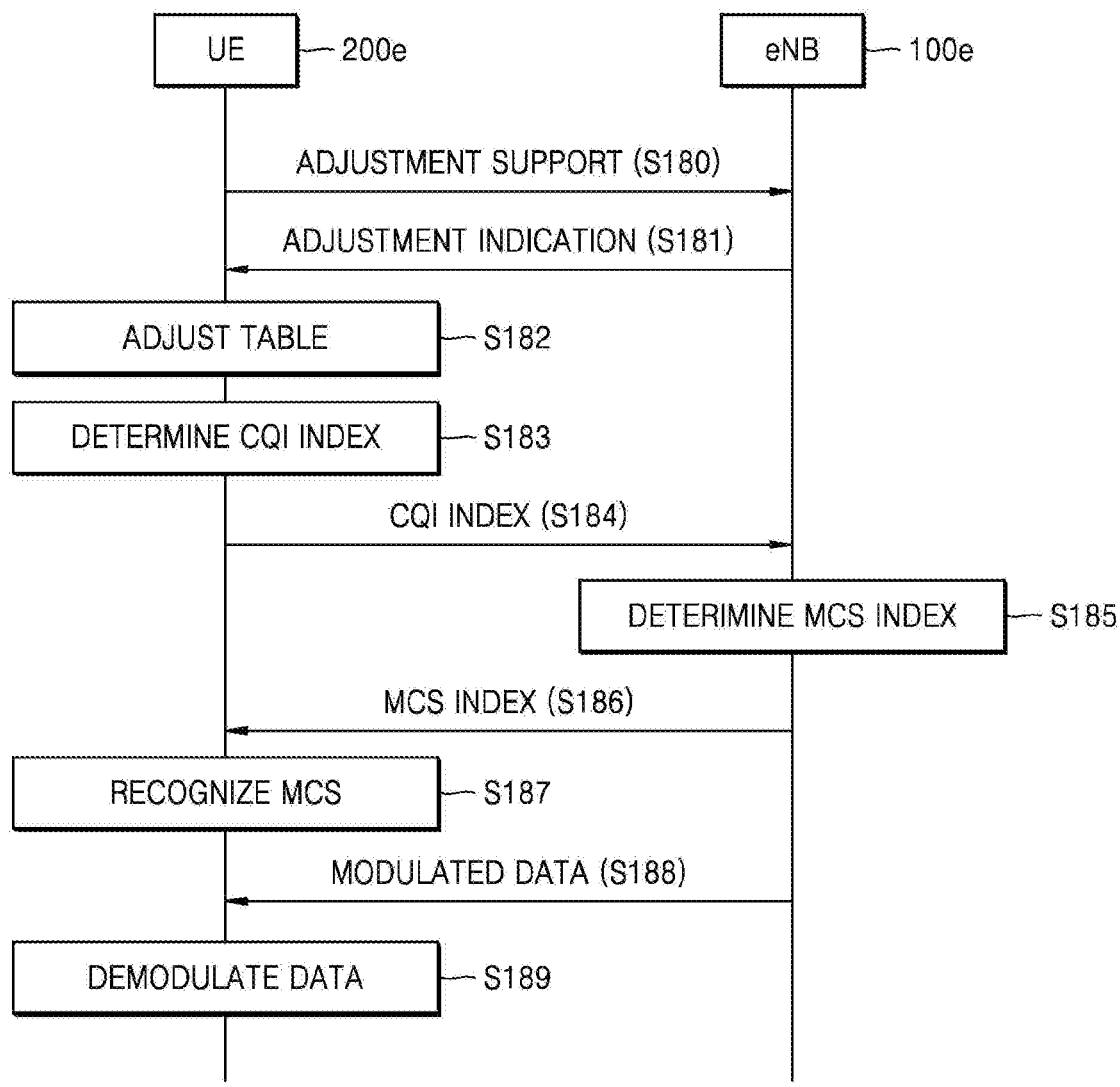
FIG. 19 is a flowchart of a wireless communication method using an MCS table, according to an example embodiment.

FIG. 19 is a flowchart of a wireless communication method using an MCS table, according to an example embodiment. Referring to FIG. 19, it is assumed that an eNB 100*e* and UE 200*e* may include the first and second tables T_64MCS and T_256MCS and the first and second CQI tables T_64CQI and T_256CQI. Hereinafter, the descriptions previously provided with reference to FIGS. 8 and 17 will not be repeated.

According to some example embodiments of the inventive concepts, the UE 200*e* may change a value of at least one entry included in the second MCS table T_256MCS in response to adjustment indication information received from the eNB 100*e*. For example, the adjustment indication information received from the eNB 100*e* may include arguments used to change the value of the entry included in the second MCS table T_256MCS. The argument may include an indicator (e.g., the MCS index indicator) of the entry to be changed, and may include, as modulation order information, a change orientation (e.g., increase or decrease), a variation (e.g., an offset), and/or a value to be changed. Similarly, the adjustment indication information may be used to cause a change of the second CQI table T_256CQI. That is, the adjustment indication information may include a CQI index indicator and modulation order information. In some example embodiments, among entries included in the second MCS table T_256MCS, some entries (e.g., MCS indices 20 to 23 or CQI index 12), which may be changed based on the adjustment indication information, may be limited.

Referring to FIG. 19, in operation S180, adjustment support information may be transmitted from the UE 200*e* to the eNB 100*e*. For example, the eNB 100*e* and the UE 200*e* may perform a capability negotiation in order to determine whether to support the second MCS table T_256MCS after initial access. The UE 200*e* may transmit to the eNB 100*e* the adjustment support information indicating availability regarding the adjustment of the second MCS table T_256MCS. In some example embodiments, the UE 200*e* may transmit to the eNB 100*e* one or more high layer signals (e.g., MAC signals and/or RRC signals) including the adjustment support information.

In operation S181, the adjustment indication information may be transmitted from the eNB 100*e* to the UE 200*e*. In some example embodiments, the eNB 100*e* may transmit the adjustment indication information to the UE 200*e* in order to change the second MCS table T_256MCS in such a manner that the second MCS table T_256MCS has the same feature as the third MCS table T_256MCS'. In some example embodiments, the eNB 100*e* may transmit the adjustment indication information to the UE 200*e* in order to change the second MCS table T_256MCS differently from the third MCS table T_256MCS'. The eNB 100*e* may transmit one or more physical layer signals (e.g., PDCCH signals and/or EPDCCH signals) including the adjustment indication information in some example embodiments, and the eNB 100*e* may transmit, to the UE 200e, one or more high layer signals (e.g., MAC signals and/or RRC signals) including the adjustment indication information in some other example embodiments.

In operation S182, the UE 200e may adjust the table. For example, the UE 200e may change values of entries included in the second MCS table T_256MCS and/or the second CQI table T_256CQI based on the arguments included in the adjustment indication information.

In operation S183, the UE 200e may determine the CQI index, and in operation S184, the determined CQI index may be transmitted from the UE 200e to the eNB 100e. In operation S185, the eNB 100e may determine the MCS index, and in operation S186, the determined MCS index may be transmitted from the eNB 100e to the UE 200e.

In operation S187, the UE 200e may recognize the MCS based on the received MCS index and the second MCS table T_256MCS changed based on the adjustment indication information, and in operation S188, the UE 200E may receive data from the eNB 100e and, in operation S189, may demodulate the received data based on a demodulation scheme according to the identified MCS.

Figure 20:
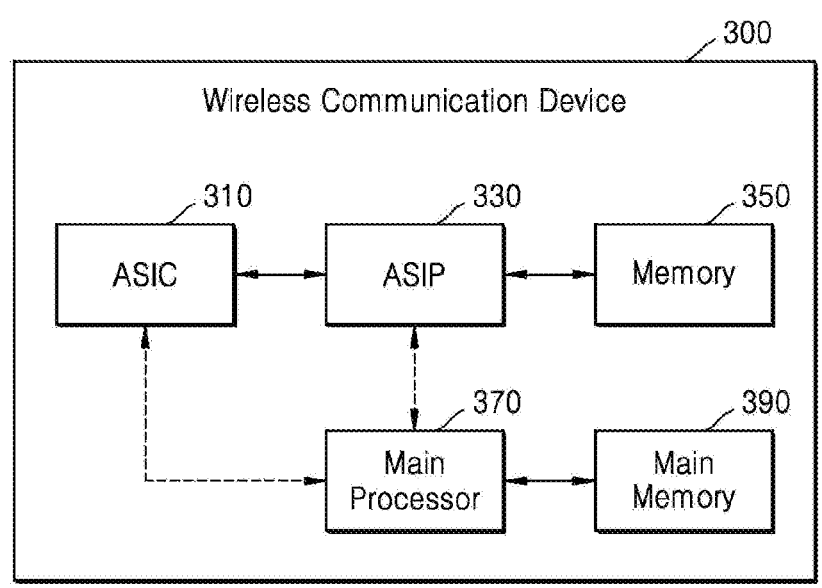
FIG. 20 is a block diagram of a wireless communication device according to an example embodiment.

FIG. 20 is a block diagram of a wireless communication device 300 according to an example embodiment. As illustrated in FIG. 20, the wireless communication device 300 may include an Application Specific Integrated Circuit (ASIC) 310, an Application Specific Instruction set Processor (ASIP) 330, a memory 350, a main processor 370, and a main memory 390. At least two of the ASIC 310, the ASIP 330, and the main processor 370 may communicate with each other. In addition, at least two of the ASIC 310, the ASIP 330, the memory 350, the main processor 370, and the main memory 390 may be embedded into one chip.

The ASIP 330 is an integrated circuit customized for a certain purpose. The ASIP 330 may support an instruction set only for a certain application and may execute instructions included in the instruction set. The memory 350 may communicate with the ASIP 330 and may store, as a non-transitory storage, the instructions executed by the ASIP 330. For example, as a non-limiting example, the memory 350 may include an arbitrary type of a memory accessed by the ASIP 330, for example, Random Access Memory (RAM), Read Only Memory (ROM), a tape, a magnetic disk, an optical disk, a volatile memory, a non-volatile memory, and a combination thereof.

The main processor 370 may execute the instructions and thus may control the wireless communication device 300. For example, the main processor 370 may control the ASIC 310 and the ASIP 330 and may process data received via a wireless communication network or a user input to the wireless communication device 300. The main memory 390 may communicate with the main processor 370 and may store, as a non-transitory storage, the instructions executed by the main processor 370. For example, as a non-limiting example, the main memory 390 may include an arbitrary type of a memory accessed by the main processor 370, for example, RAM, ROM, a tape, a magnetic disk, an optical disk, a volatile memory, a non-volatile memory, and a combination thereof.

The wireless communication method according to an example embodiment may be performed by at least one of the components included in the wireless communication device 300 of FIG. 20. In some example embodiments, at least one of operations of the wireless communication method, the MCS determiner 150, and/or the MCS recognizer 250 of FIG. 1 may be realized as the instructions stored in the memory 350. As the ASIP 330 executes the instructions stored in the memory 350, at least one of operations of the wireless communication method and at least some of operations of the MCS determiner 150 and/or the MCS recognizer 250 of FIG. 1 may be executed. In some example embodiments, at least one of operations of the wireless communication method, the MCS determiner 150, and/or the MCS recognizer 250 of FIG. 1 may be realized as a hardware block designed through, for example, logic synthesis, and the hardware block may be included in the ASIC 310. In some example embodiments, at least one of operations of the wireless communication method, the MCS determiner 150, and/or the MCS recognizer 250 of FIG. 1 may be realized as the instructions stored in the main memory 390, and as the main processor 370 executes the instructions stored in the main memory 390, at least one of operations of the wireless communication method and at least some of operations of the MCS determiner 150 and/or the MCS recognizer 250 of FIG. 1 may be executed.

While the inventive concepts have been particularly shown and described with reference to some example embodiments thereof, it will be understood that various changes in form and details may be made therein without departing from the spirit and scope of the following claims.

What is claimed is:

1. A wireless communication method comprising:
   receiving, through a wireless channel, table indication information indicating one of first and second Modulation and Coding Scheme (MCS) tables, each of the first and second MCS tables supporting up to 256 Quadrature Amplitude Modulation (QAM), the second MCS table including a same number of MCS indices as the first MCS table and including less MCS indices corresponding to 256 QAM than the first MCS table; and
   identifying one of the first and second MCS tables at a signal-to-noise ratio (SNR) according to the received table indication information to recognize a demodulation scheme for data to be received through the wireless channel,
   wherein the second MCS table includes at least one MCS index corresponding to lower modulation order and providing higher throughput than at least one corresponding MCS index included in the first MCS table, and
   the table indication information is determined by detecting respective maximum throughputs with respect to MCS indices of the first MCS table and with respect to MCS indices of the second MCS table at the SNR.

2. The wireless communication method of claim 1, wherein the at least one MCS index corresponds to 256 QAM in the first MCS table and corresponds to 64 QAM in the second MCS table.

3. The wireless communication method of claim 2, wherein
   each of the first and second MCS tables comprises MCS indices 0 to 31 that are expressed in 5 bits,
   the first MCS table comprises MCS indices 20 to 27 corresponding to 256 QAM, and
   the second MCS table comprises MCS indices 20 to 23 corresponding to 64 QAM.

4. The wireless communication method of claim 1, further comprising:
   transmitting, through the wireless channel, table support information indicating availability of the second MCS table.

5. The wireless communication method of claim 1, wherein the table indication information comprises a Control Format Indicator (CFI) received through a Physical Control Format Indicator Channel (PCFICH).

6. The wireless communication method of claim 1, further comprising:
identifying one of first and second Channel Quality Indicator (CQI) tables according to the table indication information, the first and second Channel Quality Indicator (CQI) tables being tables corresponding to the first and second MCS tables, respectively
wherein the second CQI table comprises a same number of CQI indices as the first CQI table, and the second CQI table comprises less CQI indices corresponding to 256 QAM than the first CQI table.

7. The wireless communication method of claim 6, wherein at least some of CQI indices corresponding to 256 QAM in the first CQI table correspond to 64 QAM in the second CQI table.

8. The wireless communication method of claim 7, wherein the first and second CQI tables comprise CQI indices 0 to 15 expressed in 4 bits, respectively,
the first CQI table comprises a CQI index 12 corresponding to 256 QAM, and
the second CQI table comprises a CQI index 12 corresponding to 64 QAM.

9. The wireless communication method of claim 1, further comprising:
calculating a code rate of data received through the wireless channel; and
identifying one of first and second Channel Quality Indicator (CQI) tables corresponding to the first and second MCS tables, respectively, according to the calculated code rate,
wherein the second CQI table comprises a same number of CQI indices as the first CQI table, and the second CQI table comprises less CQI indices corresponding to 256 QAM than the first CQI table.

10. A wireless communication method comprising:
transmitting, through a wireless channel, downward support information indicating availability of downward indication information;
receiving, through the wireless channel, the downward indication information;
identifying an MCS table supporting up to 256 QAM in response to the downward indication information;
receiving an MCS index through the wireless channel;
detecting a maximum throughput provided by the received MCS index at a signal-to-noise ratio (SNR), while gradually increasing or decreasing the SNR; and
recognizing a demodulation scheme of data received through the wireless channel, based on the identified MCS table and the received MCS index and in consideration of the detecting maximum throughput, the recognizing comprising selectively recognizing 64 QAM, which provides higher throughput than 256 QAM with respect to the received MCS index, as the demodulation scheme in response to the identified MCS table, the downward indication information, and the received MCS index corresponding to 256 QAM.

11. The wireless communication method of claim 10, wherein
the identified MCS table comprises MCS indices 0 to 31 expressed in 5 bits, among which MCS indices 20 to 27 correspond to 256 QAM, and
the recognizing comprises recognizing 256 QAM or 64 QAM as the demodulation scheme in response to the identified MCS table, the downward indication information, and the received MCS index being one of the MCS indices 20 to 23.

12. The wireless communication method of claim 11, further comprising:
receiving, through the wireless channel, the downward indication information indicating recognition of 64 QAM,
wherein the recognizing comprises recognizing 64 QAM from the MCS indices 20 to 23 based on the downward indication information.

13. The wireless communication method of claim 12, wherein the downward indication information comprises a Control Format Indicator (CFI) received through a Physical Control Format Indicator Channel (PCFICH).

* * * * *